United States Patent

Blum et al.

[11] Patent Number: 4,627,002
[45] Date of Patent: Dec. 2, 1986

[54] METHOD AND APPARATUS FOR RECORDING CHARACTERS

[75] Inventors: Dietrich Blum, Raisdorf; Joerg Broening, Heikendorf, both of Fed. Rep. of Germany

[73] Assignee: Dr. -Ing. Rudolf Hell GmbH, Fed. Rep. of Germany

[21] Appl. No.: 704,042

[22] Filed: Feb. 21, 1985

[30] Foreign Application Priority Data

Jan. 24, 1985 [EP] European Pat. Off. ........ 85100702.1

[51] Int. Cl.[4] .............................. G09G 1/06
[52] U.S. Cl. .................... 364/519; 358/284; 340/728
[58] Field of Search ............. 364/514, 518; 358/37, 358/284, 280, 263; 346/154; 340/728, 798–801

[56] References Cited

U.S. PATENT DOCUMENTS

| | | | |
|---|---|---|---|
| Re. 30,679 | 7/1981 | Evans et al. | 364/523 |
| 3,305,841 | 2/1967 | Schwartz | 95/4.5 |
| 3,480,943 | 11/1969 | Manber | 340/172.5 |
| 4,199,815 | 4/1980 | Kyte et al. | 364/523 |
| 4,511,893 | 4/1985 | Fukuda | 340/728 |
| 4,553,172 | 11/1985 | Yamada et al. | 358/284 |

FOREIGN PATENT DOCUMENTS 0096079 5/1982 European Pat. Off. .

OTHER PUBLICATIONS

IEEE Transactions on Computers, vol. C-23, No. 12, Dec., 1973, "An Improved Algorithm for the Generation of Nonparametric Curves", by Bernard W. Jordan, Jr. et al., pp. 1052–1060.
IEEE Transactions on Computers, vol. C-28, No. 10, Oct. 1979, "A High-Speed Algorithm for the Generation of Straight Lines and Circular Arcs", by Yasuhito Suenaga et al., pp. 728–736.

Primary Examiner—A. Evans
Attorney, Agent, or Firm—Hill, Van Santen, Steadman & Simpson

[57] ABSTRACT

A method and apparatus for element-by-element and image-line-by-image-line recording of print characters on a full page by means of an exposing beam deflectable over the full page, and which is switched on and off by a control signal. The characters are stored in a character memory in the form of contour-coded character data. The contour-coded character data are read out of the character memory in the sequence required for exposure and are converted into control signals suitable for the image-line-by-image-line recording of the characters.

30 Claims, 15 Drawing Figures

Fig. 4

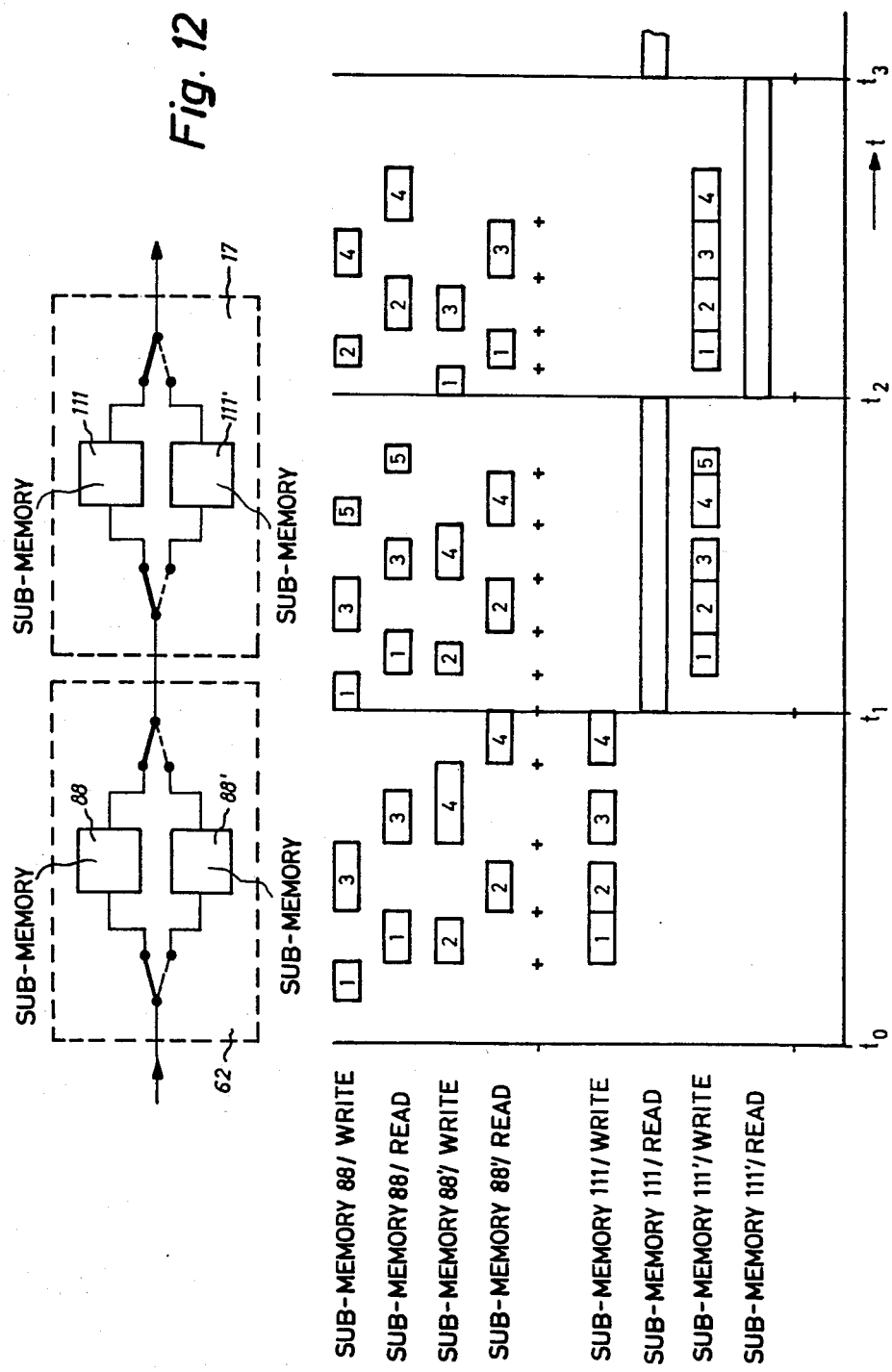

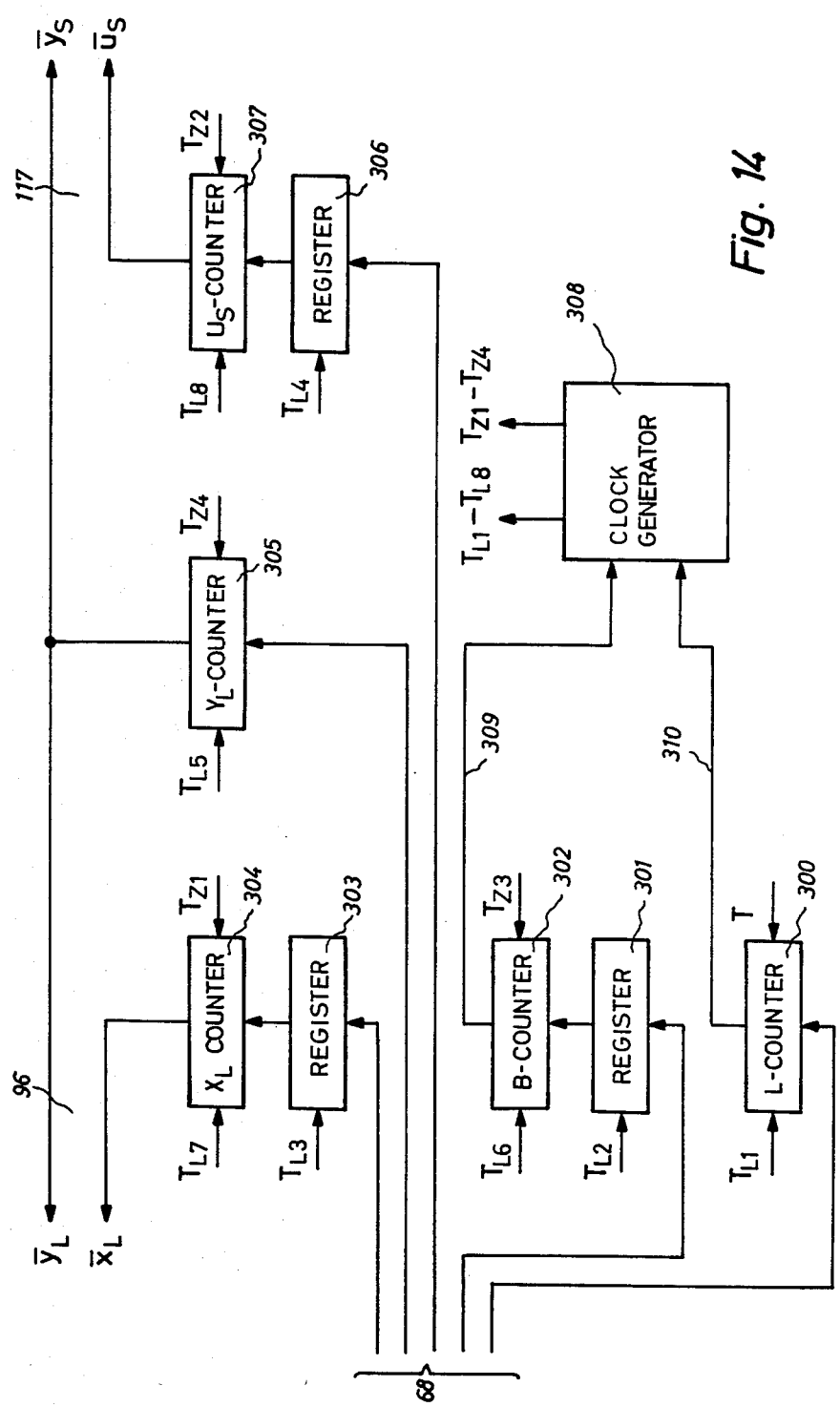

METHOD AND APPARATUS FOR RECORDING CHARACTERS

BACKGROUND OF THE INVENTION

The invention relates to a method for point-by-point and image-line-by-image-line recording of characters, particularly print characters, in a recording raster on a recording medium from stored character data. The character data of the characters to be recorded are called in and are converted into control instructions for a recording element. The invention also relates to an apparatus for the implementation of the method, the apparatus being referred to below as an electronic photocomposer.

An electronic photocomposer with an electron beam as the recording element is already known from U.S. Pat. No. 3,305,841, incorporated herein by reference. The characters required for a composing job are stored in a character memory in the form of font data. The text to be composed is converted into text data in a composition computer, the text data representing the composing instructions for the photocomposer. In a composing mode, the text data successively call the font data required for recording the text data from the character memory and the read-out font data are converted into a video signal which supplies the control instructions for the electron beam tube. Each character is recorded on the picture screen of the electron beam tube, and is composed of a plurality of juxtaposed vertical picture lines in a continuous line grating in the direction of the text lines. The characters are composed of black and white segments in accordance with their contours by means of a trace unblanking/blanking of the electron beam as controlled by the video signal.

The characters recorded on the picture screen of the electron beam tube are exposed on a recording medium by an optical system.

Given this known photocomposer, the characters of the individual alphabets must be stored for all occurring type sizes so that the capacity of the character memory is extremely high.

It is traditional to store the characters in the form of coded font data in order to reduce the capacity of the character memory. There are various coding methods for this purpose. For example, a point-by-point coding of characters is known from U.S. Pat. No. 3,305,841, incorporated herein by reference, a run length coding for the picture line segments is known from U.S. Pat. No. 3,480,943, incorporated herein by reference, and a coding of the contour lines of characters is known from German Pat. No. 29 19 013, incorporated herein by reference.

German Pat. No. 24 22 464 (corresponding to U.S. Pat. Re No. 30,679, incorporated herein by reference) already discloses a method for contour coding of characters and for conversion of the contour-coded font data into control instructions for the electron beam of an electron beam tube when recording or composing the characters. In this contour coding, the characters are described by pairs of contour lines in an XY coordinate system wherein the x-coordinates are modified in steps of equal length. Every pair of contour lines is defined by the y-coordinates of the starting points and by the slopes of the contour lines. The slopes are expressed as changes of the y-coordinates for successive x-coordinate steps. The curvature of a character contour is thus specified as a sequence of changing slopes. The characters are again constructed on the electron beam tube of juxtaposed image lines proceeding vertically to the text lines. Thus, every character is recorded in and of itself in the position prescribed by the line of text to be set or composed, and all characters of the text lines are successively recorded. The control instructions for switching the electron beam on and off are acquired by determining the respective intersections of the pairs of contour lines with the image line currently to be recorded, the electron beam being switched respectively on between an upper and a corresponding lower contour line.

The described way of acquiring the control instructions requires a relatively great computation time, so that a high recording speed is not achieved. Although a typographically high-quality of the photocomposing is achieved by employing an electron beam tube as the recording element, it is disadvantageous that the usable picture screen area of the electron beam tube and thus the recording format are limited. At present, there is a desire to compose entire newspaper pages in one work pass. In order to compose such a newspaper page in a photocomposer comprising an electron beam tube, a relative displacement between the picture screen area and the recording medium must be undertaken between individual sub-exposures having the size of the usable picture screen area. This, however, requires great mechanical expense, leads to positioning errors, and slows the recording speed.

European Patent application No. EP-A-0096079, incorporated herein by reference, already discloses a method and an apparatus for line-by-line and image-line-by-image-line recording of whole newspaper pages in a recording raster from coded font data according to a layout plan. For this purpose, a recording element, for example a mosaic recording element, is conducted picture-element-by-picture-element across the overall width of the entire newspaper page, so that respective full lines of the entire newspaper page are recorded. Every image line is composed of sub-image-lines which belong to different text blocks or text lines in accordance with the layout plan. The coded font data required for recording the individual sub-image-lines are called from a character memory and are decoded into control instructions. The control instructions of the individual sub-image-lines are ordered in accordance with the sequence of the individual sub-image-lines within the full image lines and are deposited picture-element-by-picture-element in the recording raster in a memory for the full newspaper page, so that the memory content reproduces the recordable information of the full newspaper page with picture element precision. During the recording of the full newspaper page, the individual control instructions are then output picture-element-by-picture-element and image-line-by-image-line, and are synchronized with the movement of the recording element across the recording medium, and are supplied to the recording element.

In order to save memory capacity, European Patent application No. EP-A-0096079, incorporated herein by reference, likewise already discloses that the full newspaper page be exposed in successive strips whose height covers a plurality of image lines and whose width corresponds to the width of the full newspaper page. For this strip-by-strip recording, only the coded font data belonging to the individual positions of the strip are respectively called in, edited into control instructions for the number of image lines corresponding to the height of the strip, and stored in a so-called window memory whose capacity corresponds only to the number of picture elements for one strip. Before the shift of the strip into a new position on the newspaper page, the control instructions are transferred by image lines from the window memory into a buffer memory having the same capacity and are read out from the buffer memory for the control of the recording element while the emptied window memory is re-filled. This memory principle, however, has the disadvantage that a transfer time for the control instructions must be established in every shift of the strip. This limits the recording speed. The specified method only functions faultlessly when the height of the window memory corresponds to the height of the largest character to be recorded. However, this condition which must be observed has the disadvantage that the required height of the window memory must always be re-defined on the basis of the character instructions when the text data are input and the memory controller must be correspondingly programmed. The maximum memory capacity must be selected such that the height condition is fulfilled even for the largest characters, for example in headlines on a newspaper page. A further disadvantage of the specified method is that the write-in of the control instructions into the window memory is particularly complicated and time-wasting when a character to be recorded does not lie fully in one strip (EP-A-No. 0096079, FIG. 12) or when two successive characters in a textline have different bottom line levels (EP-A-No. 0096079, FIG. 14). In these cases, control instructions for the first character must always be overwritten from sub-areas of the window memory into the buffer memory before these sub-areas can be occupied with control instructions for the following character. The publication contains no indications whatsoever as to how one should proceed when recording cursive characters and rotated text lines. It is also known to employ a deflectable laser beam as the recording element for recording such newspaper pages.

SUMMARY OF THE INVENTION

It is an object of the present invention to specify a method and an apparatus for picture-element-by-picture-element and image-line-by-image-line recording of characters, particularly print characters, with which characters are contour-coded and with which the contour-coded character data can be precisely and quickly converted into control instructions for the picture-element-by-picture-element and image-line-by-image-line recording in the recording raster.

With respect to the method of the invention, this object is achieved in that before the recording every closed contour of a character proceeding from a starting point on every contour is described by contour segments following one another in one circumferential direction around the contour. Coordinate values x, y of the contour segments in a coding raster of a first $\overline{XY}$ coordinate system referenced to an em-quad (also known as em-square) associated with the character. These values are stored as coded character data. During recording, the coded character data of every character to be recorded is called up by the text data and coordinate values $x_0$, $y_0$ of starting points on every contour and the coordinate values x, y of the contour segments are modified by a dimensional or scaling factor derived from a recording size of the characters and from a relationship of the recording raster to the coding raster. Picture element coordinates x*, y* of those picture elements of the recording raster which optimally approximate a corresponding contour segment are determined for every successive contour segment of the character by respective interpolation steps $x_i$, $y_i$ between intersections of the recording raster executed from a starting point to an end point of a contour segment. Interpolation steps $x_i$, $y_i$ are checked for a change of direction. Every identified picture element between two successive interpolation steps $x_i$, $y_i$ is respectively marked by a market signal as a switch point for the recording element when a fixed directional change of the corresponding interpolation steps $x_i$, $y_i$ has taken place. A switch point memory oriented in picture element and image line fashion is provided for the switch point marker signals of a character or character segment, a second $\overline{XY}$ coordinate system being allocated to this memory. Every memory line and every picture element is addressable by coordinate values $\overline{x}$, $\overline{y}$. Write addresses $\overline{x}_s$, $\overline{y}_s$ for the switch point memory are calculated from the picture element coordinates x*, y* of the picture elements of a character or character segment marked as switch points and from the position of the character or character segment to be recorded on the recording medium. The switch point marker signals are intermediately stored under the calculated write addresses $\overline{x}_s$, $\overline{y}_s$. A video memory oriented in picture element and image line fashion is provided for video data of the character for at least one image line of the recording raster. A third $\overline{UV}$ coordinate system is allocated to said video memory. Every memory line and every picture element therein are addressable by coordinate values $\overline{u}$, $\overline{v}$. The switch point marker signals of a character or character segment stored in the switch point memory are overwritten line-wise character-by-character as video data onto those memory locations of the video memory which correspond to a position of the character or character segment to be recorded on the recording medium. Given line-by-line overwriting of the switch point marker signals onto the corresponding memory locations of the video memory, the memory locations lying between the addressed memory locations in line direction are also occupied with video data at the same time. The read addresses $\overline{u}_L$, $\overline{v}_L$ for the video memory are formed from the coordinate values u, v of the picture elements currently to be recorded referenced to a fourth UV coordinate system allocated to the recording medium. The video data stored under the read addresses $\overline{u}_L$, $\overline{v}_L$ are read out for recording the characters or character segments, and the video data is employed as the control signal for the recording element so that the recording element is switched on or off for a respective duration of the control signal.

In particular, a high recording speed and a good recording quality are achieved with the method of the invention. By the specified contour coding, the editing of the coded character data into control instructions is particularly simple for all print modifications without character data for the individual modifications having to be separately stored. The editing, moreover, occurs distortion-free and with high resolution.

BRIEF DESCRIPTION OF THE DRAWINGS

FIG. 4 is an illustrative embodiment of a video signal generator;

FIG. 12 is a time diagram;

FIG. 14 is a diagram of an address controller shown in FIG. 9.

DESCRIPTION OF THE PREFERRED EMBODIMENTS

Figure 1:
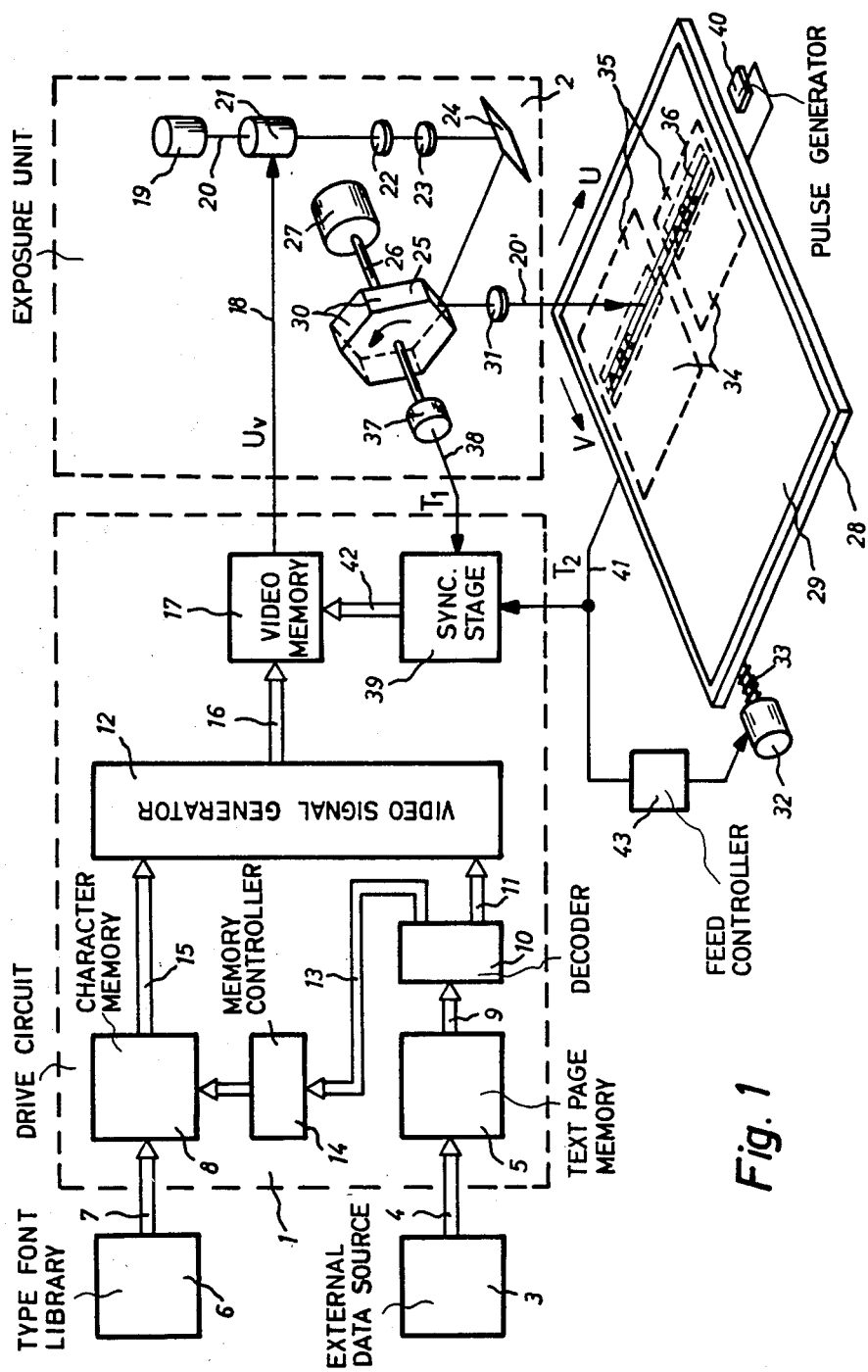
FIG. 1 is a schematic block diagram of a fundamental structure of the apparatus for the implementation of the method of the invention.

FIG. 1 shows a fundamental structure of an electronic photocomposer for composing full newspaper pages, referred to in brief as full pages, from stored characters and signs on the basis of picture-element-by-picture-element and image-line-by-image-line exposure of a recording medium by use of a light beam moved relative to the recording medium. Such a photocomposer comprises a drive circuit 1 which converts the text to be set into a video signal $U_v$ and comprises an exposure unit 2 controlled by the video signal $U_v$.

The text data required for the exposure of the full page are overwritten from an external data source 3 in which the text data of a text which is already line-justified by a composition computer are stored into a text page memory means 5 of the drive circuit 1 via a data line 4. Simultaneously, the character and type fonts required for the exposure of the corresponding full page as contour-coded character and type data, referred to in general as type data below, are transferred out of a type font library 6, which is likewise external, into a character memory 8 of the drive circuit 1 via a data line 7. The contour coding shall be described in greater detail below with reference to the graphic presentation in FIG. 3.

The text data of the full page are read out from the text page memory means 5 and are supplied via a data line 9 to a decoder 10 which decodes the text data into font and position instructions as well as into character instructions. The font instructions such as, for example, type size, density, type angle, cursive angle and recording fineness, and the position instructions for the individual text lines, are supplied to a video signal generator 12 via a data line 11. The recording instructions proceed via a data line 13 to a memory controller 14 for the character memory 8. There, the character instructions address the contour-coded font data of the characters and print characters to be exposed, these being referred to in general as characters, below. These characters are read out for characters from the character memory 8 and are supplied via a data line 15 to the video signal generator 12.

Taking the corresponding font instructions into consideration, the video signal generator 12 converts the contour-coded font data into digital switch point marking signals which, via a data line 16, are oriented in terms of picture element and image line in a following video memory means 17 and are intermediately stored in the sequence required for the image-line-by-image-line exposure and are forwarded from there via a line 18 to the exposure unit 2 as video signal $U_v$.

The exposure unit 2 comprises a light source 19, for example a laser generator. The light beam 20 generated by the light source 19 proceeds through a light modulator 21 in the form, for example, of an acousto-optical modulator (AOM), through a pin diaphragm 22, and through a lens 23 onto a path-folding mirror 24, and is then reflected onto a polyhedral rotating mirror 25 (polygonal mirror) whose rotational axis 26 lies perpendicular to the optical axis of the light beam 20. A motor 27 rotates the polyhedral rotating mirror 25 in the direction of the arrow with constant angular velocity. A recording medium in the format of the full page to be exposed is disposed on a flatbed recording carrier 28. For example, the recording medium 29 is film material of a light-sensitive printing plate. Due to the rotation of the polyhedral rotating mirror 25, the light beam 20' reflected by the individual mirrored faces 30 and focussed onto the recording medium 29 by means of a lens 31 is deflected across the recording medium 29 image-line-by-image-line in the recording direction (U-direction), whereby the flatbed recording carrier 28 simultaneously executes a stepped or continuous feed motion (V-direction) perpendicular to the recording direction. This feed motion is executed with the assistance of a motor 32 and a spindle 33. In this way, the light beam 20' sweeps the recording medium 29 in respective full image lines 36 in the recording raster whose screen ruling depends on the recording fineness or on the picture element and image lines spacings. For example, such a full page encompasses individual text blocks, also referred to as articles, which are disposed in accordance with a layout plan. The text blocks 34 are composed of individual text lines 35, and the text line 35 is composed of the characters to be exposed. Each text line 35 usually encompasses a plurality of image lines 36. Since the light beam 20' respectively exposes a full image line 36 whose length approximately corresponds to the full width of the full page, every full image line 36 is composed of sub-image-lines which belong to different text blocks 34 or text lines 35. The video signal generator 12 must, therefore, join the individual sub-image lines to form the full image lines 36 since the edited video data of the individual picture elements are deposited at those memory locations of the video memory means 17 which correspond to the positions of the corresponding picture elements within the full image lines 36. The exposure of the recording medium 29 can occur positively or negatively.

For example, given positive exposure, every image line or sub-image-line is composed of unexposed white segments and of exposed black segments. In this case, the characters are constructed in image line fashion of black segments, whereby only one respective black segment in every successive character is exposed during the recording of a full image line 36. The lengths of the black segments and of the white segments are defined by the on-time which is controlled by the video signal $U_v$ on the line 18 by means of the acousto-optical modulator 21.

The read-out of the video signal $U_v$ out of the video memory means 17 is synchronized with the relative motion of the light beam 20' across the recording medium 29. For this purpose, a pulse generator 37 is coupled to the rotational axis 26 of the polyhedral rotating mirror 25, this pulse generator generating a picture element clock sequence $T_1$. The picture element clock sequence $T_1$ is supplied to a synchronization stage 39 functioning as an address controller via a line 38.

An opto-electronic pulse generator 40 is disposed outside of the flatbed recording carrier 28 in the deflection plane of the light beam 20', this opto-electronic pulse generator 40 generating a clock sequence $T_2$ "End of Image Line" on a line 41 when the light beam 20' arrives at the respective end of a full image line 36, this clock sequence $T_2$ being likewise supplied to the synchronization stage 39. Read addresses and read instructions for the video memory means 17 are acquired in the synchronization stage 39 from the picture element clock sequence $T_1$ and from the clock sequence $T_2$ "End of Image Line". These read addresses and read instructions are supplied to the video memory means 17 via an address and control line 42. Given a stepped feed motion of the flatbed recording carrier 28, the clock sequence $T_2$ "End of Image Line" is simultaneously supplied to a feed controller 43 for the feed motor 32 which respectively executes a feed step to the next image line 36 at the end of a full image line 36. Alternatively, the exposure unit 2 can also be composed of a photodiode array or of a photodiode matrix.

In the simplest case, the full page 29 is exposed in one pass. In this case, the video memory means 17 is designed as a full page memory oriented in picture element and image line fashion, and in which the video data for all picture elements of the full page 29 are stored in the sequence required for the exposure. Such a full page memory having the height of the full page and the width of a full image line then reproduces the information of the full page with picture element precision.

In an advantageous fashion, the full page 29 is exposed in strip-shaped sections in chronological succession such that an exposure window having the height h and the width of a full image line 36 is shifted across the full page 29 in steps by the respective height h. This procedure is presented graphically in greater detail in FIG. 2a.

FIG. 2a again shows the full page 29 to be exposed comprising the image lines 36 and a text line 35 onto which a specific plurality of image lines 36 results. The exposure window 200 has, for example, the height h corresponding to a plurality q of image lines 36 and the width of a full image line 36 comprising p picture elements. The position of the exposure window 200 on the full page is respectively defined by a vertical coordinate value $v_F$ (upper edge of the exposure window). In the position I of the exposure window 200 having the coordinate value $v_{F1}$, for example, the image lines $v_0$ through $v_{q-1}$ are exposed. Subsequent thereto, the exposure window 200 is shifted regardless of the position of the text line 35 by its height h into position II having the coordinate value $v_{F2}$, and the corresponding image lines $v_q$ through $v_{2q-1}$ are exposed. Since the illustrated text line 35 does not fully fall into one of the exposure windows 200, this text line is recorded according to the invention by means of two successive exposures, namely the upper part of the text line 35 in the position I and the lower part of the text line 35 in the position II of the exposure window 200, whereby a high recording speed is achieved.

Figure 2A:
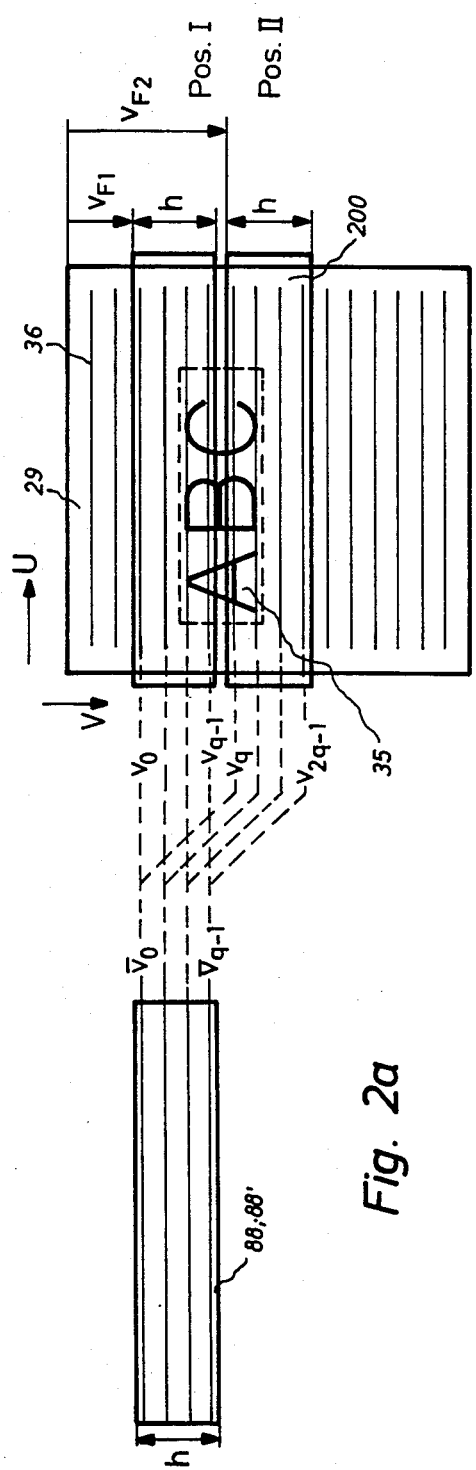
FIGS. 2a and 2b are a graphic presentation for illustrating an exposure window and a search window, respectively.

In this case, the video memory means 17 as an intermediate memory comprises a low-capacity sub-memory 88 oriented in picture element and image line fashion, this being merely schematically indicated in FIG. 2a. This sub-memory has the height of the exposure window 200 comprising q memory rows $\overline{v}_0$ through $\overline{v}_{q-1}$ and the width of a full image line 36, and thus has a storage capacity for $p \times q$ video data. Only those video data respectively belonging to the individual positions of the exposure window 200 are deposited in this sub-memory 88, so that the sub-memory 88 respectively reflects only the information of the corresponding exposure window 200 on the full page 29. During exposure of the full page 29, therefore the memory rows $\overline{v}_0$ through $\overline{v}_{q-1}$ of the sub-memory 88 must be allocated to the image lines just to be exposed in the respective position of the exposure window 200, for example the image lines $v_0$ through $v_{q-1}$ in position I of the exposure window 200 and the image lines $v_q$ through $v_{2q-1}$ in position II, as schematically indicated in FIG. 2a.

Two sub-memories 88 and 88' which work in alternate communication are advantageously provided in the illustrative embodiment. While the video data for the position of the exposure window 200 to be recorded at the moment is being read out of the one sub-memory, the new video data for the following position of the exposure window 200 are already being written into the other sub-memory.

As already mentioned, the video data respectively belonging to the individual positions of the exposure window 200 on the full page 29 must be deposited in the sub-memories picture-element-by-picture-element and image-line-by-image line in the sequence required for the exposure within the corresponding exposure window 200, and must be read out therefrom in the same fashion. Which text data or video data derived therefrom are respectively required therefor is dependent on the layout plan of the full page 29 to be recorded.

In the simplest case, the text data stored in unordered fashion in the text data source 3, are pre-sorted in the required sequence in the text page memory means 5 before the exposure, and are then converted into the video data. This, however, is time-intensive. Given the illustrative embodiment, by contrast no pre-sorting occurs. Advantageously, the text data required therein for the respective current position of the exposure window 200 are searched from the set of unsorted text data during the exposure. In this search routine, an identification is first carried out in the text page memory means 5 as to which articles and text lines respectively fall entirely or only partially into the current position of the exposure window 200, and the relevant text data are then called up in the sequence of their identification and are converted into the video data.

Figure 2B:
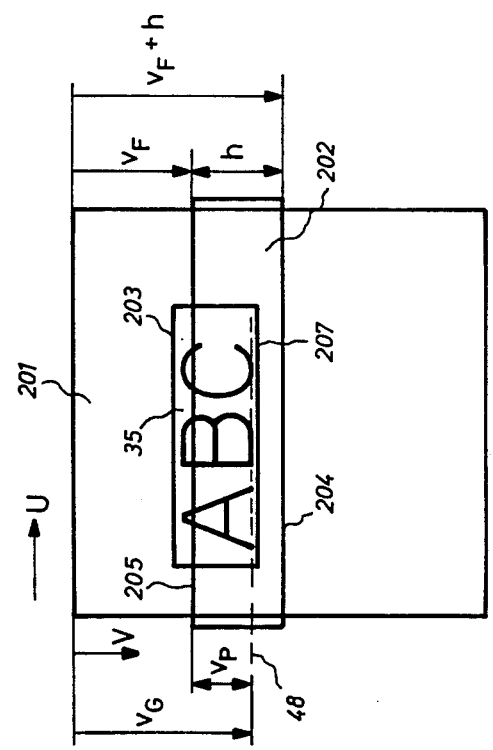

This search routine is graphically explained with reference to FIG. 2b. FIG. 2b shows a layout plan 201 of the full page 29 to be exposed and having the text line 35. The search routine can then be envisioned such that a search window 202 corresponding to the exposure window 200 (FIG. 2a) on the full page 29 is shifted across the layout plan 201, and only the text data of those text lines 35 are called up which fall entirely in the respective position of the search window 202 or are only partially visible in the search window 202.

For this purpose, the text data contain article geometry data and line geometry data which define the position of the articles and text lines in the layout plan 201 by coordinate values u and v. The articles and text lines respectively falling or extending into the corresponding search window 202 are therefore identified by investigating the geometry data, i.e. by means of a comparison of the vertical coordinate values v of the text lines with the vertical coordinate value $v_F$ for the various positions of the search window 202 on the layout plan 201 in the text page memory means 5. For example, this is accomplished by comparing the upper edge 203 of the text line 35 with the lower edge 204 ($v_F + h$) of the search window 202, and the upper edge 205 ($v_F$) of the search window 202 is compared with the lower edge 207 of the text line 35. In the illustrated example, only a part of the text line 35 falls into the search window 202, the vertical expanse $v_P$ of this text line 35 deriving from the difference of the coordinate value $V_G$ of the font bottom line 207 of the text line 35 and the coordinate value $v_F$.

The method and apparatus of the invention shall be described in greater specific detail below.

In a first method step in the contour coding of the characters, closed contour lines proceeding from a starting point on every contour are described by successive straightline segments or straightline segments and curved segments, and their coordinate values are defined in a coding raster referred to the character em-quad and are stored as contour-coded font data.

The contour coding of the characters and the form of the coded font data deposited in the character memory 8 of the drive circuit 1 shall be explained with reference to FIG. 3.

Figure 3:
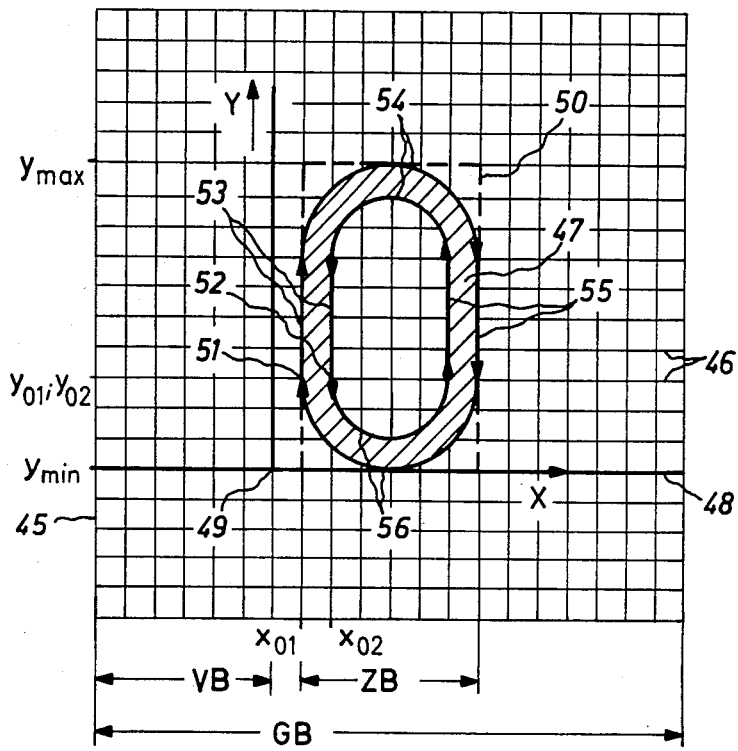
FIG. 3 is a graphic presentation of a character emquad.

FIG. 3 shows a character em-quad 45 having a coding raster 46 which corresponds to the maximum possible recording fineness. A character, a highly simplified "O" in the illustrated example, is shown on the font bottom line 48 in the coding raster 46. An XY coordinate system whose X-axis and whose origin lie on the font bottom line 48 of the character 47 is provided for the contour coding of the character 47. The character 47 is surrounded by a rectangular character area 50 which contains the actual information of the character 47. The width of the character area 50 corresponds to the character width (ZB) and the height is specified by the values $y_{max}$ and $y_{min}$ of the font bottom line 48. The front porch width (VB) and the overall width (GB) of the character em-quad 45 are also entered.

In the contour coding of the character, closed circumferential lines (contours) are travelled in specific coding directions proceeding from a starting point on every contour and are described by successive contour segments whose nature, length and position or attitude are specified as coded font data. The contour segments can be unit vectors, vectors of differing length, or straightline and curved segments. For example, an outside contour is traced in a clockwise direction and an inside contour is traced in a counterclockwise direction.

In a preferred contour coding, the contour lines, as shown in FIG. 3, are described by contour segments in the form of straightline segments and circular segments. In the character "O" shown in highly simplified form, both the outside contour proceeding from a starting point 51 having the coordinates $x_{01}$ and $y_{01}$ as well as the inside contour proceeding from a starting point 52 having the coordinates $x_{02}$ and $y_{02}$ are described in the coding directions (rotation in the direction of the arrows) by straightline segments 53, circular segments 54, straightline segments 55, and circular segments 56.

In the font code, respectively successive contour segments of the same type (straightline segment, circular segment in a clockwise direction, circular segment in a counterclockwise direction) are combined to form a contour instruction. The contour instruction contains an identifier for the type, and an indication regarding the plurality of contour segments as well as the coordinate values x and y for the individual contour segments referred to the XY coordinate system. Consequently, the end point coordinates are respectively indicated for a straightline segment and a circular segment, and the starting coordinates relative to a center of the circle of the corresponding circular segment are additionally indicated for a circular segment.

The contour instruction for a straightline segment contains the following particulars:
1. "Straightline Segment" (Lin);
2. Plurality of straightline segments;
3. End point coordinates x and y of the first straightline segment; and
4. End point coordinates x and y of the second straightline segment as well as end point coordinates x and y of further straightline segments in accordance with the plurality of straightline segments of Point 2.

By contrast, the contour instruction for a circular segment contains the following particulars:
1. "Clockwise Circular Segment" (CW) or "Counterclockwise Circular Segment" (ACW);
2. Plurality of successive circular segments;
3. Starting point coordinates x and y of the first circular segment as relative coordinates referred to the center point of the circular segment; and
4. End point coordinates x and y as absolute values, as well as repetition of Points 3 and 4 for further circular segments corresponding to the plurality of Points 2.

Further contour instructions determine the end of a contour and the end of the entire character.

The contour-coded font data of the individual characters which are deposited in the character memory 8 are composed of the contour instructions for the individual contour segments of the character as well as of the characteristics of the character em-quad 45, whereby the following points 1 through 4 are characteristics and the points 5 through 10 are contour instructions:
1. Front porch width (VB);
2. Character width (ZB);
3. Overall width (GB);
4. Vertical extent $y_{max}$ and $y_{min}$ of the character area 50;
5. Starting point coordinates $x_0$ and $y_0$ of the first contour;
6. Contour instructions for the first contour (straightline and circular segments);
7. Contour instruction "End of Contour";
8. Starting point coordinates $x_0$ and $y_0$ of the second contour;
9. Contour instruction for the second contour (straightline and circular segments); and
10. Contour instruction "End of Contour", as well as repetitions of points 5 through 7 in accordance with the plurality of contours, whereby the contour instruction "End of Character" is given at the end of the last contour of a character instead of the contour instruction "End of Contour".

Figure 4:
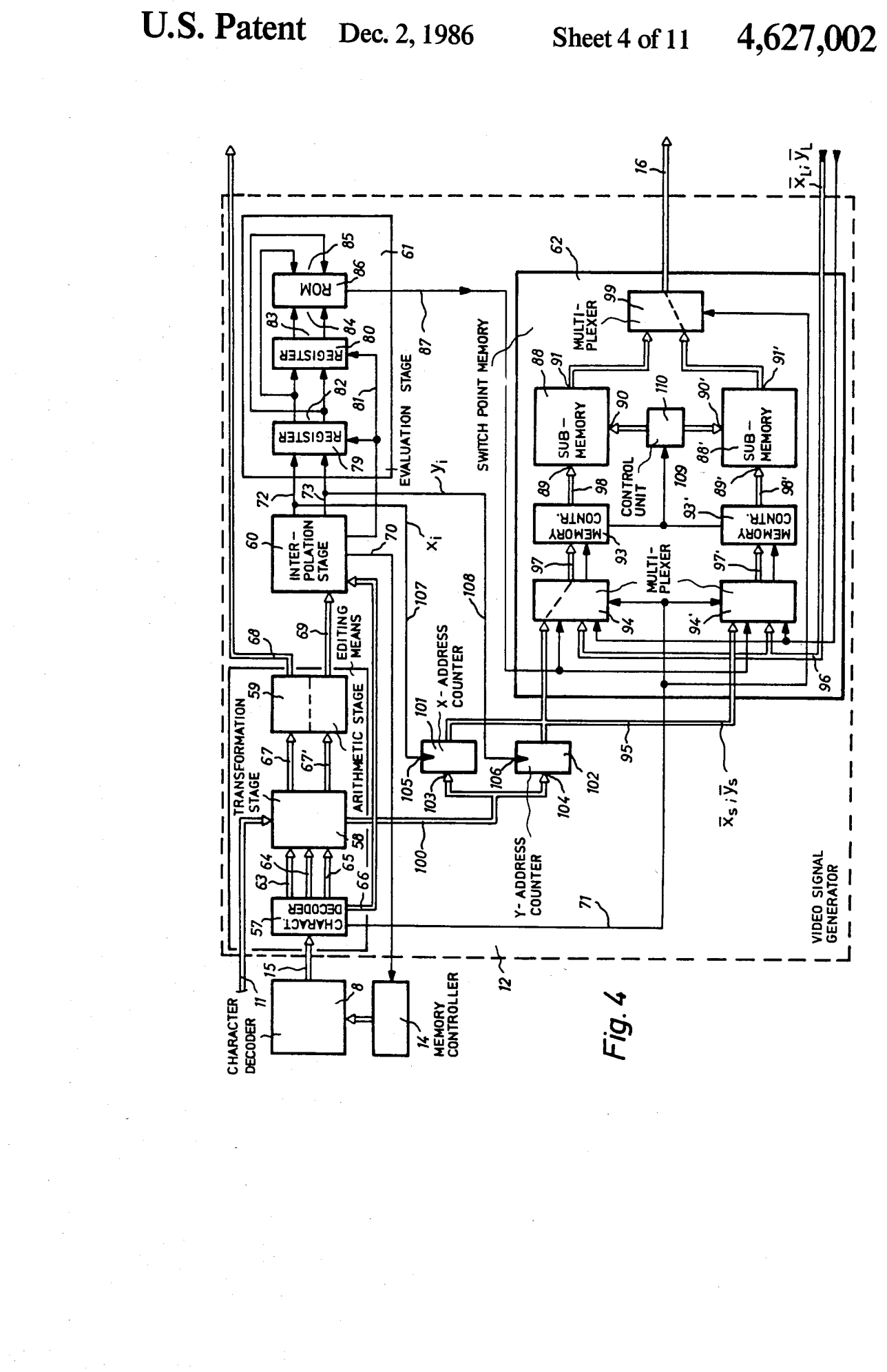

The contour-coded font data readout of the character memory 8 are further processed in the video signal generator 12, this being explained in greater detail in FIG. 4.

The video signal generator 12 comprises a character decoder 57, a transformation stage 58, an arithmetic unit 59, an interpolation stage 60, an evaluation stage 61, as well as a switch point memory means 62.

In a second method step in the video signal generator 12 for every character called up, the coordinate values $x_0$ and $y_0$ of the starting points and the end point coordinates x and y of the contour segments are first modified by a dimensional or scaling factor which derives from the character size to be recorded and from the relationship between the recording raster and the coding raster. For this purpose, the contour-coded font data read out of the character memory 8 via the data line 15 are decoded in the character decoder 57 into the length values "Front Porch Width" (VB), "Character Width" (ZB), and "Overall Width" (GB). They are also decoded into $y_{max}$ and $y_{min}$ of the character area 50 on a data line 63, and are further decoded into the starting point coordinates $x_0$ and $y_0$ on a data line 64. The font data is also decoded into the end point coordinates x and y for the individual contour segments on a data line 65, and into the contour instructions "Lin" for straightline segments, "CW" for clockwise circular segments and "ACW" for counterclockwise circular segments on a data line 66. The contour instructions are supplied via the data line 66 to the interpolation stage 60.

The font instructions such as recording fineness, font size, cursive angles, and font angle are supplied to the transformation stage 58 via the data line 11. In the transformation stage 58, the length values, the starting point coordinates $x_0$ and $y_0$, and the end point coordinate values x and y of the contour segments which are stored in the character memory 8 coded in the coding raster, are modified by said dimensional or scaling factor. The font angle and the cursive angle may also be additionally taken into consideration under given conditions in the modification of the length values and of the starting point coordinates $x_0$ and $y_0$. In the arithmetic unit 59, the modified and, under given conditions, rotated character area 50' is calculated from the modified character width ZB' and the modified values $y'_{max}$ and $y'_{min}$ that are supplied to the arithmetic unit 59 from the transformation stage 58 via a data line 67. The calculated starting point coordinates $x_0'$ and $y_0'$, the width ZB', and the length $y'_{max} - y'_{max}$ of the new character area 50', as well as the modified overall width GB' of the character em-quad 45, are output via a data line 68. At the same time, the differential values $\Delta x$ and $\Delta y$ between the starting point and the end point of every contour segment are calculated in the arithmetic unit 59 from the modified end point coordinate values x' and y' of the contour segments on the data line 67', and are overwritten into the interpolation stage 60 via a data line 69. Units 57, 58, and 59 thus form an editing means 100.

The contour-coded font data have thus been edited for conversion into the video data for the recording element.

In a third method step, those switch points for the exposure unit 2 which are required for recording the characters are identified in the form of the video data. By means of a step-by-step interpolation between the intersections of the recording raster or matrix for the individual, successive contour segments of a character, those picture elements in the recording matrix which optimally approximate the contour segments are first identified for this purpose. In the interpolation, respectively successive interpolation steps are checked for a change in direction and the picture elements lying between two successive interpolation steps are then marked as relevant switch points by a switch point marker signal when a specific combination of interpolation steps is present.

In the interpolation in the interpolation stage 60, every contour segment is approximated from its starting point up to its end point by means of right-angles, interpolation steps $\pm x_i$ and $\pm y_i$ having the step width of the recording matrix, and in the direction of the recording matrix and/or by means of diagonal steps $\pm x_i / \pm y_i$.

The picture element coordinates x* and y* thus result according to equation (1) from the modified starting point coordinates $x'_0$ and $y'_0$ and from an appropriate operational sign addition of the interpolation steps performed for the picture elements:

$$x^* = x'_0 + \sum_{1}^{n} x_i \qquad (1)$$

$$y^* = y'_0 + \sum_{1}^{n} y_i$$

As soon as the end point of a contour segment is reached, a signal "Segment End" is generated in the interpolation stage 60, this signal being forwarded via a line 70 to the memory controller 14 for the character memory 8, whereby the font data of the next contour segment of the corresponding character are output for further processing until the font data of all contour segments of the corresponding character have been output, and a signal "End of Character" on a line 71 is generated in the character decoder 57.

Figure 13:
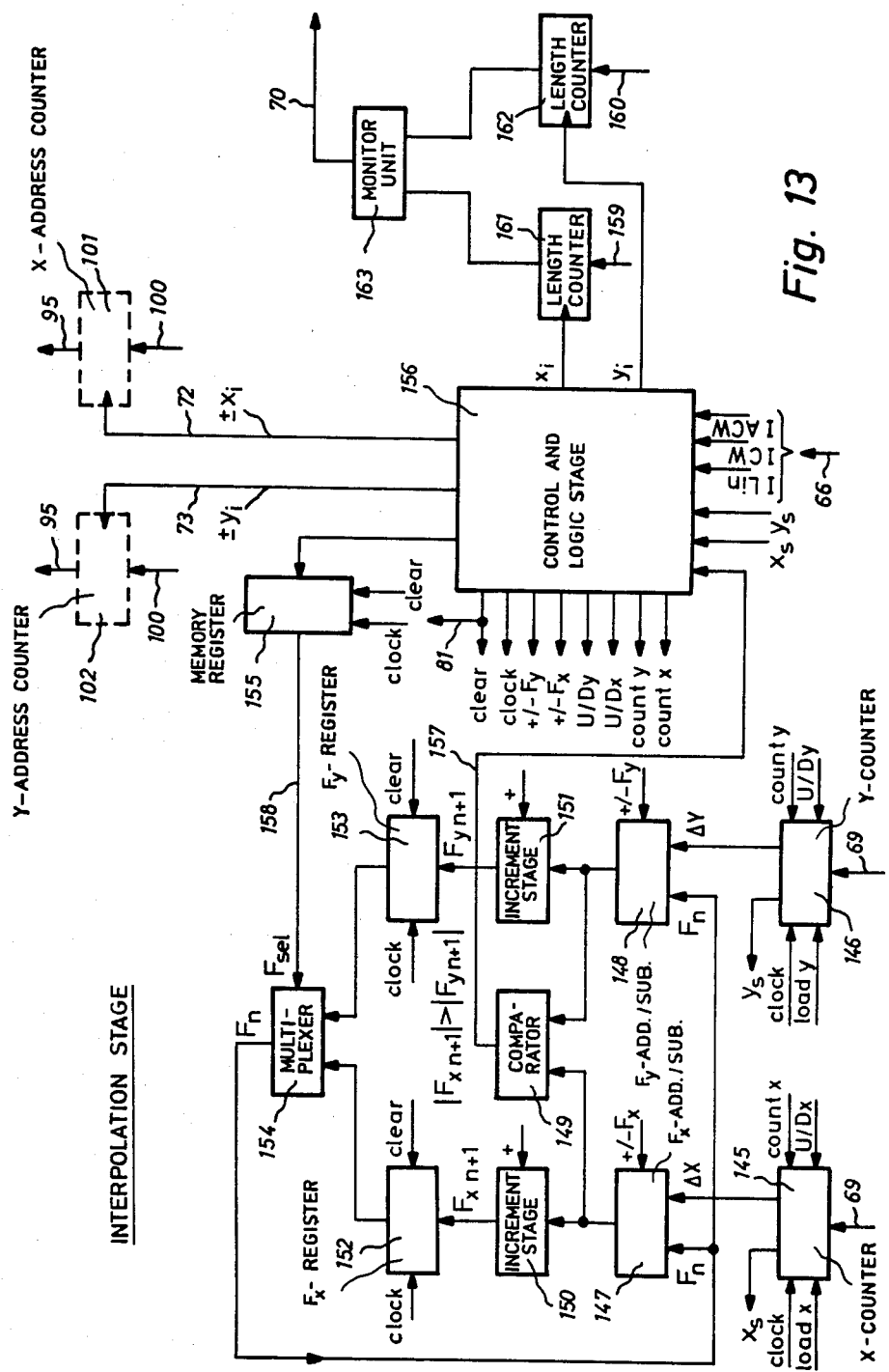
FIG. 13 is an illustrative embodiment of an interpolation stage.

FIG. 13 shows an illustrative embodiment of the interpolation stage 60. In order to investigate the interpolated picture elements for relevant switch points, the executed interpolation steps $\pm x_i$ and $\pm y_i$ are forwarded via lines 72 and 73 to the evaluation stage 61 wherein, in order to determine the relevant switch point, the respective direction of one interpolation step is compared to the direction of the preceding interpolation step. A picture element is then marked as a switch point when at least one of the successive interpolation steps occurs perpendicular to the image line direction and both successive interpolation steps occur in a coding direction. Thus, a specific combination of interpolation steps is present. Redundant switch points are thus advantageously suppressed, particularly on horizontal contour segments.

The evaluation stage 61 is composed, for example, of two series-connected registers 79 and 80 for intermediate storage of the interpolation steps $\pm x_i$ and $\pm y_i$ with their corresponding operational signs. The registers 79 and 80 are clocked via a line 81 from the interpolation stage 60. The interpolation step written into the register 79 is transferred into the register 80 with the next clock, whereas the following interpolation step is then written into the register 79, so that two successive interpolation steps are respectively stored in the registers 79 and 80. The data outputs 82 and 83 of the registers 79 and 80 are conducted to the address inputs 84 and 85 of a read-only memory 86 in which the interpolation step combination for marking the picture elements as switch points dependent on a directional change of two successive interpolation steps in a coding direction is stored. These combinations of interpolation steps are listed below in the form of a Table, whereby every switch point is identified with a switch-point-marking signal value "H".

| $n^{th}$ interpolation step | (n + 1) Interpolation Step | | | | | | | |
|---|---|---|---|---|---|---|---|---|
| | $+x_i$ | $-x_i$ | $+y_i$ | $-y_i$ | $+x_i/+y_i$ | $+x_i/-y_i$ | $-x_i/+y_i$ | $-x_i/-y_i$ |
| $+x_i$ | L | H | L | H | L | H | L | H |
| $-x_i$ | H | L | H | L | H | L | H | L |
| $+y_i$ | H | L | H | L | H | L | H | L |
| $-y_i$ | L | H | L | H | L | H | L | H |
| $+x_i/+y_i$ | H | L | H | L | H | L | H | L |
| $+x_i/-y_i$ | L | H | L | H | L | H | L | H |
| $-x_i/+y_i$ | H | L | H | L | H | L | H | L |
| $-x_i/-y_i$ | L | H | L | H | L | H | L | H |

When a picture element is recognized as a switch point, the read-only memory 86 or the evaluation stage 61 emits a corresponding switch point marker signal on a line 87.

Figure 5:
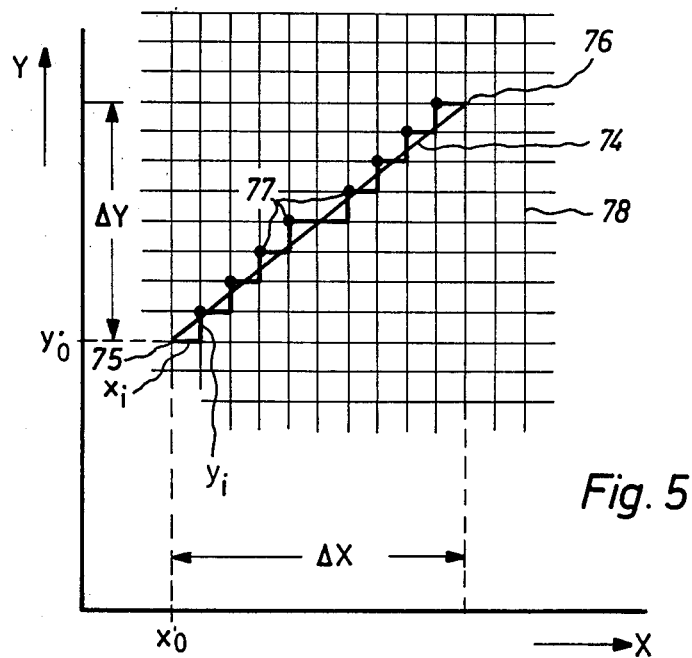
FIG. 5 is a graphic presentation showing interpolation.

FIG. 5 is intended to illustrate the determination of the switch points. Those picture elements 77 in the recording raster 78 which optimally approximate the straightline segment 74, are determined by interpolation steps $\pm x_i$ and $\pm y_i$ along a straightline segment 74 between a starting point 75 having the coordinates $x'_0$ and $y'_0$ end point 76 having the coordinates $x'_0 + \Delta x$ and $y'_0 + \Delta y$. The picture elements 77 marked as switch points in the evaluation stage 61 are emphasized in FIG. 5 by heavier dots.

All switch points of a character have thus been identified.

In a fourth method step, a switch point image of the character is constructed in the switch point memory means 62 by writing the signal values "H" of the switch point markers of the relevant switch points of a character at the corresponding memory locations. Accordingly, the switch point image of an entire character or of a character segment arises, dependent on the position of the character with reference to the current position of the exposure window 200 or of the search window 202 (FIG. 2), and specifically of that character segment that respectively extends into the exposure window 200 or search window 202.

Figure 6:
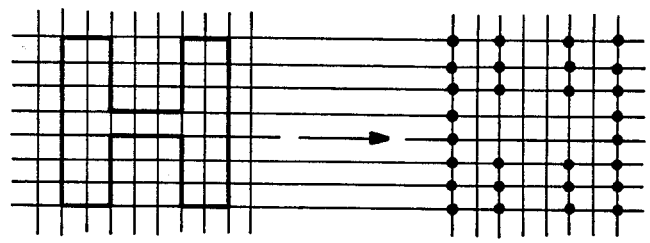
FIG. 6 is a switch point image.

FIG. 6 shows such a switch point image (at the right) for the letter "H" (at the left).

An $\overline{XY}$ coordinate system is allocated to the memory locations of the switch point memory means 62, so that every memory location is addressable by coordinate values $\overline{x}$ and $\overline{y}$. The switch point memory means 62 has a "width" which is dependent on the character size and on the character rotation, and the "height" of the exposure window 200 or search window 202, and thus q memory lines $\overline{y}_0$ and $\overline{y}_{q-1}$.

In the simplest case, the switch point memory means 62 is organized as a bit map memory, i.e. every memory location has a picture element or switch point of the character em-quad allocated to it which is addressable by the corresponding coordinate values. In a preferred embodiment, a 16-bit data word is storable under every address in order to save memory capacity. The allocation of picture element or switch points and addresses is provided such that every 16-bit data word represents a field of 4×4 picture elements or switch points. The write addresses $\overline{x}_{Sn}$ and $\overline{y}_{Sn}$ for the switch point memory means 62 in the $\overline{XY}$ coordinate system which are required for marking the switch points of a character or character segment result according to equation (2) from the picture element coordinates x* and y* in the XY coordinate system according to equation (1), and from the position of the character or character segment with respect to the current position of the exposure window 200 or of the search window 202 in the UV coordinate system:

$$\overline{x}_{Sn} = x'_0 + \sum_1^n x_i \qquad (2)$$

$$\overline{y}_{Sn} = v_G - v_F - y'_0 - \sum_1^n y_i.$$

The coordinate values $x'_0$ and $v_G - v_F - y'_0$ thus represent the respective start addresses for the corresponding character or the corresponding character segment in the switch point memory means 62.

Figure 7:
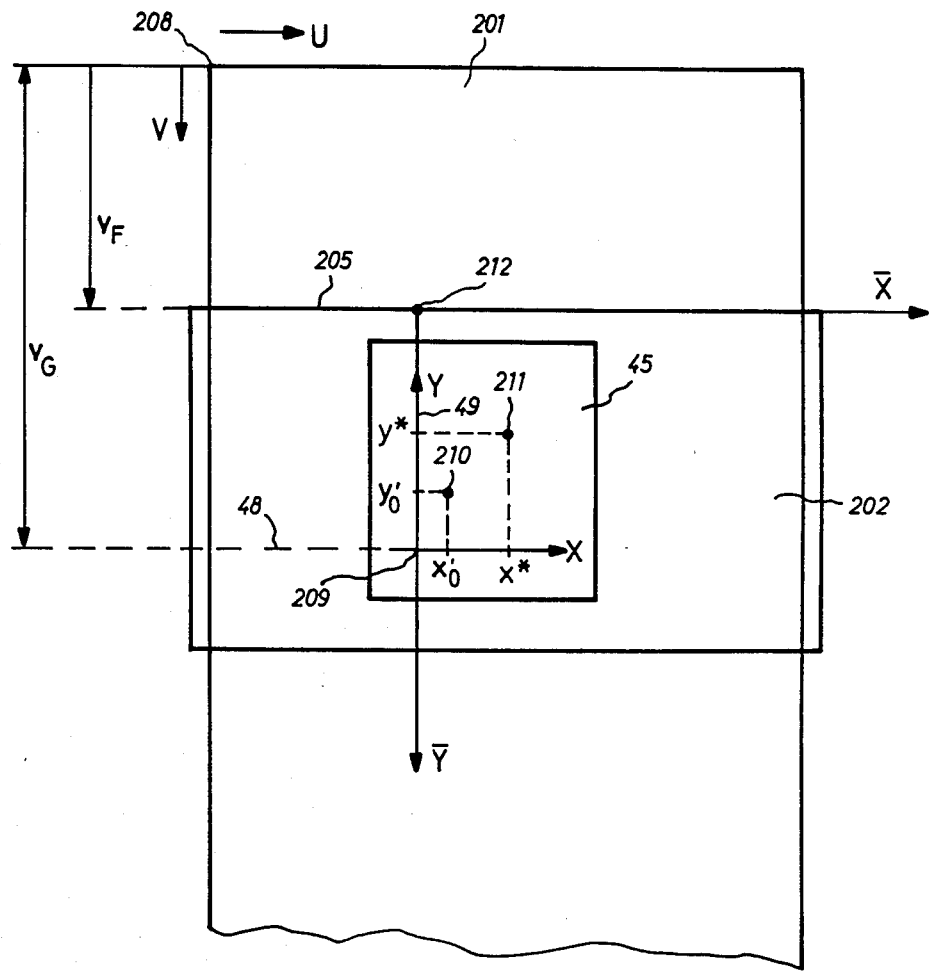
FIG. 7 is a graphic presentation with respect to address identification.

The geometrical relationships are illustrated in the graphic presentation of FIG. 7. FIG. 7 shows the layout plan 201 with the search window 202 in the UV coordinate system having the origin 208. The search window 202 has the positional value $v_F$. Shown in the search window 202 are a character em-quad 45 and its XY coordinate system 49 (FIG. 3) having the origin 209. The point 210 represents a starting point on a contour having the coordinate values $x'_0$ and $y'_0$ and the point 211 represents an interpolated picture element having the picture element coordinates x* and y*, whereby:

$$x^* = x'_0 + \sum_1^n x_i \text{ and } y^* = y'_0 + \sum_1^n y_i$$

apply. The value $v_G$ represents the coordinate value of the base line 48 of the character em-quad 45 in the UV coordinate system. Also entered is the $\overline{XY}$ coordinate system allocated to the switch point memory means 62 and having the origin 212. The $\overline{X}$ axis of the $\overline{XY}$ coordinate system coincides with the upper edge 205 of the search window 202. Whereas the UV coordinate system referred to the layout plan 201 or to the full page 29 is stationery, the $\overline{XY}$ coordinate system shifts with the search window 202 or with the exposure window 200.

The values $\overline{y}_{Sn}$ deriving from the equations (2) are also monitored for $\overline{y}_0 > \overline{y}_{Sn} > \overline{y}_{q-1}$ and are only accepted as write addresses for the switch point memory means 62 when the calculated values $\overline{y}_{Sn}$ lie within the boundary values $\overline{y}_0$ and $\overline{y}_{q-1}$ which define the height of the switch point memory means 62 or the height of the search window 202. Advantageously by this monitoring of the identified switch points of a whole character, only those switch points which belong to a character portion extending into the search window 202 are transferred into the switch point memory means 62 under given conditions, and a fast memory filling is thus achieved.

The structure of the switch point memory means 62 shall be described specifically in greater detail below.

The switch point memory means 62 comprises a memory having two separate memory areas or, as in the illustrative embodiment, having two individual sub-memories 88 and 88' with address inputs 89 and 89', data inputs 90 and 90', and data outputs 91 and 91'. The sub-memories 88 and 88' likewise work in alternate communication, i.e. while the switch point marker signals of the switch points of a character identified in the evaluation stage 61 are written into the one sub-memory, the switch point marker signals of the preceding character previously written into the other sub-memory are already read out therefrom and overwritten into the video memory means 17.

Every sub-memory 88 and 88' has a memory controller 93 or 93' and a multiplexer 94 or 94' allocated to it. With the assistance of the multiplexers 94 and 94', and dependent on the momentary operating mode of the sub-memories, the write addresses $\bar{x}_{Sn}$ and $\bar{y}_{Sn}$ on an address line 95 or the read addresses $x_L$ and $y_L$ on an address line 96 are connected through via the address line 97 or 97' to the corresponding memory controllers 93 or 93', and are connected through from there via address lines 98 or 98' to the address inputs 89 or 89' of the sub-memories 88 or 88'. With the assistance of a further multiplexer 99, the data outputs 91 and 91' of the sub-memories 88 and 88' are connected through onto the data line 16 dependent on the write or read mode of the submemories 88 and 88'. Since a change in operating mode of the sub-memories 88 and 88' respectively occurs after the determination of the switch points of a character, the multiplexers 94, 94', and 99 are switched over to the line 71 by the signal "End of Character", under the pre-condition that the readout of the other sub-memory has already ended. Otherwise, the switch-over occurs after the conclusion of the readout.

The sub-memories 88 and 88' are constructed, for example, of dynamic RAM modules.

The write addresses $\bar{x}_{Sn}$ and $\bar{y}_{Sn}$ for the switch point memory means 62 on the address line 95 are acquired in accordance with equations (2) in an X-address counter 101 and a Y-address counter 102 which are designed as bidirectional counters.

For this purpose, the starting point coordinates $x'_0$ calculated in the transformation stage 58 are forwarded via a data line 100 to the acceptance input 103 of the X-address counter 101 and the starting point coordinates $y'_0$ as well as the coordinate values which identify the position of the corresponding character relative to the search window 202 are forwarded via the data line 100 to the acceptance input 104 of the Y-address counter 102.

The clock inputs 105 and 106 of the X-address counter 101 and of the Y-address counter 102 are connected via lines 107 and 108 to the interpolation stage 60. Via the lines 107 and 108, the interpolation steps $\pm x_i$ and $\pm y_i$ executed in the interpolation stage 60 are counted into or out of the address counters 101 and 102 in accordance with their operational signs. The counter reading of the X-address counter 101 directly forms the write address $\bar{x}_{Sn}$ of the memory locations in the sub-memories 88 or 88' which are to be respectively called in. The Y-address counter contains an additional monitoring device by means of which the current counter reading of the Y-address counter 102 is only forwarded as write address $\bar{y}_{Sn}$ when the counter reading lies between the afore-mentioned boundary values $\bar{y}_0$ and $\bar{y}_{q-1}$.

When the evaluation stage 61 has recognized a picture element as a switch point, then the switch point marker signal is forwarded from the output of the evaluation stage 61 via the line 87 and one of the multiplexers 94 or 94' to that memory controller 93 or 93' which is currently in a write mode and is converted there into a write instruction on a line 109. On the basis of the write instruction, a logical "H" as a switch point marker signal for the corresponding switch point is stored in the sub-memory 88 or 88' operating in the write mode under the currently called write address $\bar{x}_{Sn}$ and $\bar{y}_{Sn}$ with the assistance of a control unit 110 which is connected to the data inputs 90 and 90' of the sub-memories 88 and 88'. In this fashion, all switch points of a character or of a character segment are marked in the corresponding sub-memory 88 or 88' until the corresponding sub-memory 88 or 88' is switched to read mode by the signal "End of Character" on the line 71. Both the writing as well as the reading are executed in Read-/Modify/Write cycles. During writing, an EXOR operation between the data already stored and the data to be written is formed in the control unit 110.

Figure 8:
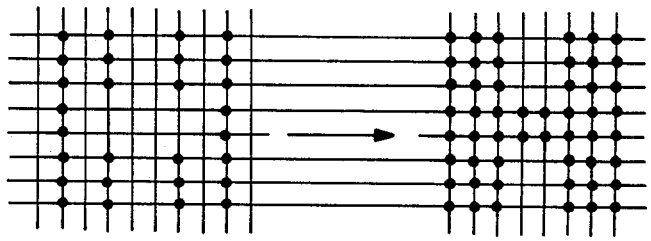
FIG. 8 shows further switch point images.

In a fifth method step, the switch point images respectively stored in the switch point memory means 62 for a character or a character part are successively transferred line-by-line into the video memory means 17 and are respectively stored there at those memory positions which correspond to the positions of the corresponding character or character part in the text line or in the image line 36 on the recording medium 29 until the switch point images of all characters of the corresponding image lines are overwritten. At the same time, the switch point images overwritten from the switch point memory means 62 which contain only the switch points of the outside and inside contours of the characters (FIG. 6) are augmented to the effect that all picture elements lying between the leading edges and the trailing edges of the black image segments are now identified in the video memory means 17 with video data "H". FIG. 8 shows this procedure, whereby the switch point image stored in the switch point memory means 62 is shown at the left and the filled switch point image stored in the video memory means 17 is shown at the right.

Figure 9:
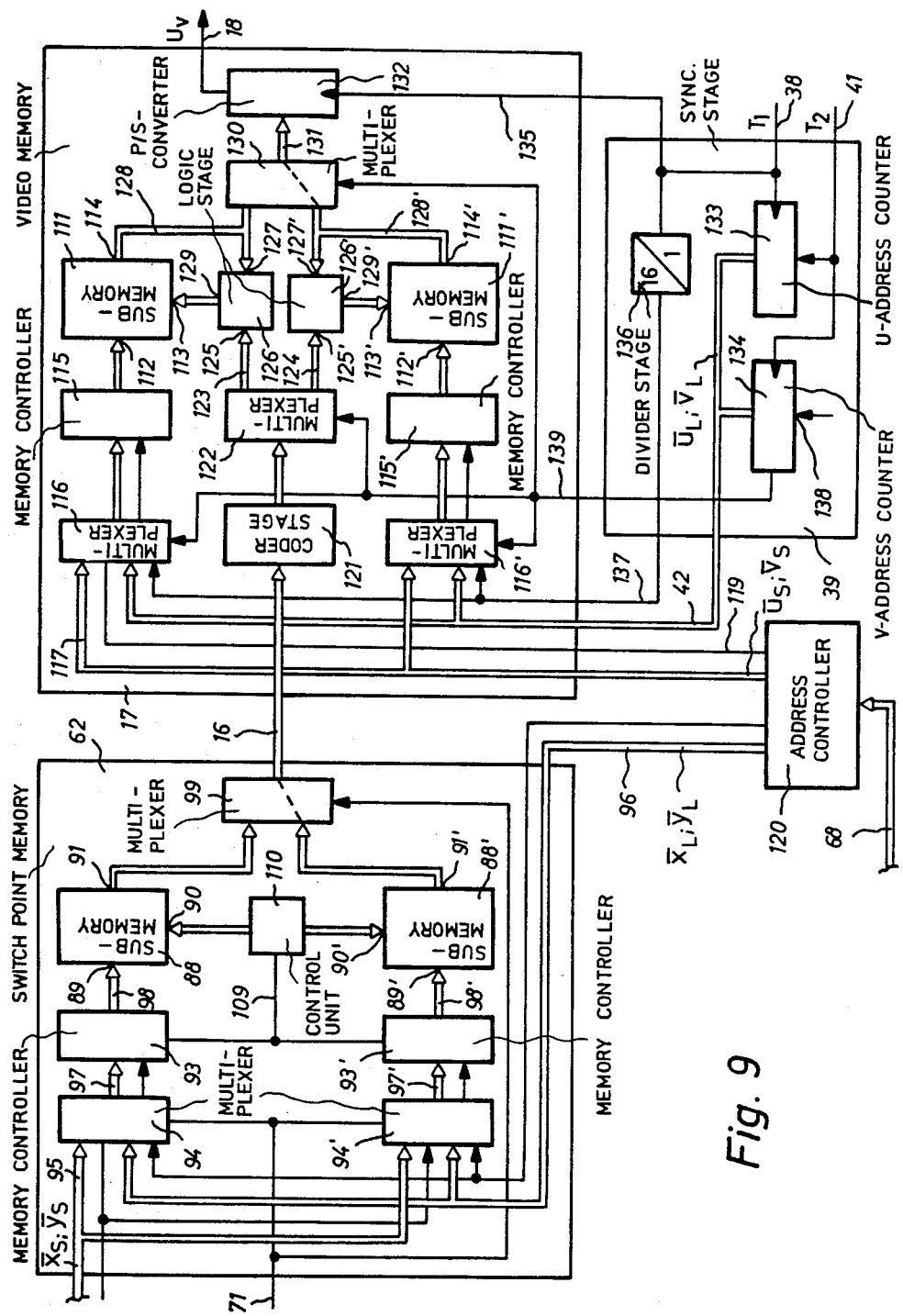
FIG. 9 is an illustrative embodiment of a video memory means.

FIG. 9 shows an illustrative embodiment of the video memory means 17. Since the switch point memory means 62 already described in detail in FIG. 4 is in interactive communication with the video memory means 17, the switch point memory means 62 has been shown again in FIG. 9 for the purpose of a better understanding.

The memory locations of the video memory means 17 have a $\overline{UV}$ coordinate system allocated to them, so that every memory location is addressable by coordinate values $\bar{u}$ and $\bar{v}$.

In a preferred embodiment, the video memory means 17 is likewise designed as an alternating memory having two sub-memories 111 and 111'. While the switch point marker signals from the switch point memory means 62 are being written into one of the sub-memories 111 or 111', the video data are being read out of the other sub-memory as a control signal and are being supplied to the exposure unit 2.

The sub-memories 111 and 111' are likewise constructed of dynamic RAM modules. Every sub-memory 111 and 111' has the width of a full image line 36 of the full page 29 with p picture elements per image line and a height of q memory lines $\bar{v}_0$ through $\bar{v}_{q-1}$ which corresponds to the height of the switch point memory means 62 and to the height of the exposure window 200 with q image lines. The switch point marker signals for p·q picture elements are thus storable in every sub-memory 111 and 111'.

In the simplest case, the sub-memories 111 and 111' are likewise designed as bit map memories.

In a preferred embodiment, a 16-bit data word which contains the video data of 16 picture elements lying side-by-side on an image line is storable under every address of a sub-memory 111 and 111'.

Memory controllers 115 or 115' as well as multiplexers 116 or 116' are allocated to the sub-memories 111 and 111' having address inputs 112 and 112', data inputs 113 and 113', and data outputs 114 and 114'. With the assistance of the multiplexers 116 and 116', and dependent on the momentary operating mode of the sub-memories 111 and 111', the write addresses $\bar{u}_S$ and $\bar{v}_S$ on an address line 117 or the read addresses $\bar{u}_L$ and $\bar{v}_L$ which are generated in the synchronization stage 39, are connected via the address line 42 and the multiplexers 116 and 116' to the corresponding memory controller 115 or 115'.

The read addresses $\bar{x}_L$ and $\bar{y}_L$ for the switch point memory means 62 on the address line required for overwriting the switch point images from the switch point memory means 62 into the video memory means 17, the write addresses $\bar{u}_S$ and $\bar{v}_S$ for the video memory means 17 on the address line 117, and the corresponding read and write instructions on lines 118 and 119 are formed in an address controller 120.

The address controller 120 generates the read addresses $\bar{x}_L$ and $\bar{y}_L$ for the switch point memory means 62 such that the memory locations are called up memory-line-by-memory-line and picture-element-by-picture-element within every memory line, whereby only the actual character area 50 of the character (FIG. 3) is called up, namely the address area corresponding thereto. Thus, only those memory locations at which information is actually stored are interrogated, whereby the time required for overwriting the switch point images is reduced in an advantageous way. The modified length values of the character area 50' are supplied via the data line 68 to the address controller 120 for flagging the address area.

Figure 10:
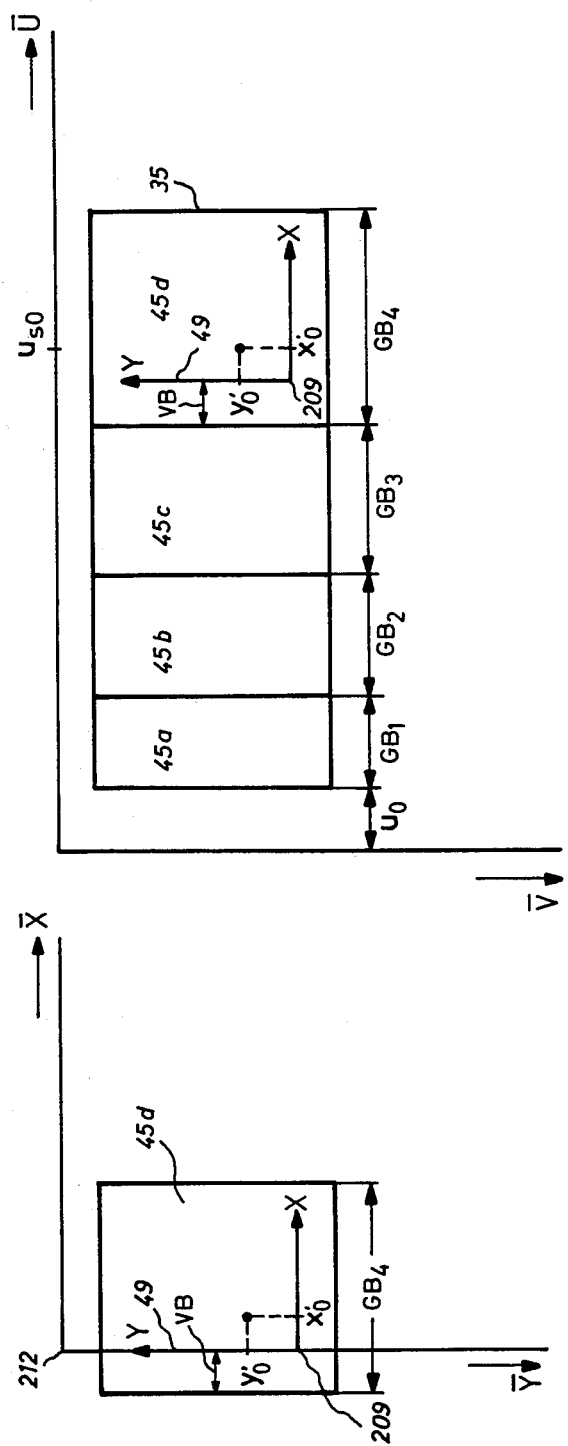
FIG. 10 is a further graphic presentation with respect to address identification.

The calculation of the write addresses $\bar{u}_S$ and $\bar{v}_S$ for the video memory means 17 shall be explained with reference to the graphic presentation in FIG. 10. The $\overline{XY}$ coordinate system for the switch point memory means 62 in which a character em-quad 45d is disposed is shown at the left-hand side. The $\overline{UV}$ coordinate system of the video memory means 17 is indicated at the right-hand side. The switch point images for three character em-quads 45a, 45b, and 45c of a text line 35 have already been written into the video memory means 17. The switch point image for a fourth character em-quad 45d is to be transferred out of the switch point memory means 62.

The starting write address $\bar{u}_{S0}$ in a U-direction (image line direction) thus results:

$$\bar{u}_{S0} = \bar{u}_0 + \Sigma GB + VB. \tag{3}$$

In equation (3), $\bar{u}_0$ is the starting coordinate of the text line 35 on the full page 29; GB$_1$, GB$_2$, GB$_3$, and GB$_4$ are the respective overall width of a character em-quad 45;

$\Sigma$GB is the sum of the overall widths of all character em-quads 45a, 45b, and 45c already overwritten ($\Sigma$GB$_1$+GB$_2$+GB$_3$ in the example); and VB is the front porch width of the character em-quad 45d to be currently overwritten. The running write address $\bar{u}_S$ in the $\overline{U}$-direction then results from the starting write address $\bar{u}_{S0}$:

$$\bar{u}_S = \bar{u}_{S0} + \bar{x}_L. \tag{4}$$

The running write address $\bar{v}_S$ in the $\overline{V}$-direction (perpendicular to the image line direction) is then $$\bar{v}_S = \bar{y}_L. \tag{5}$$

The required values are supplied to the address controller 120 via the data line 68. The switch point marker signals read out via the data line 16 from the sub-memory 88 or 88' in the read mode are recoded in a coder stage 121 in accordance with the differing organization of the switch point memory means 62 and of the video memory means 17, and are supplied to a further multiplexer 122 which is connected via data lines 123 and 124 to the first data inputs 125 and 125' of two logic stages 126 and 126'. The second data inputs 127 and 127' of the logic stages 126 and 126' are connected via data lines 128 and 128' to the data outputs 114 and 114' of the sub-memories 111 and 111', whereas the data outputs 129 and 129' of the logic stages 126 and 126' are in communication with the data inputs 113 and 113' of the sub-memories 111 and 111'. In the logic stages 126 and 126', the data to be written can be advantageously logically combined, for example combined by means of an OR operation, with the data already stored in the sub-memories 111 and 111', and can be transferred into the corresponding sub-memories 111 and 111'. The above-explained filling of the memory locations lying between two switch points with video data "H" (FIG. 8) also takes place in the logic stages 126 and 126'.

The data outputs 114 and 114' of the sub-memories 111 and 111' are conducted via the data lines 128 and 128' to a further multiplexer 130 whose output is connected via a data line 131 to a parallel-to-serial converter 132. In the parallel-to-serial converter 132, every 16-bit data word stored under a sub-memory address is serially converted into 16 video signal values for 16 successive picture elements on an image line.

The readout of the video data as video signal U$_v$ for the exposure unit 2 from the sub-memory 111 or 111' in read mode is controlled by the synchronization stage 39. The picture element clock sequence T$_1$ supplied via the line 38 is counted into a U-address counter 133 and the clocks T$_2$ "End of Image Line" supplied via the line 41 are counted into a V-address counter 134. The U-address counter 133 is respectively reset by the clocks T$_2$ "End of Image Line". The counter readings u and v of the two address counters 133 and 134 indicate the current position of the light beam 20' on the recording medium 29. The read addresses $\bar{u}_L$ and $\bar{v}_L$ required for the readout of the video data from the video memory means 17 then derive from the counter readings u and v as:

$$\bar{u}_L = u$$

$$\bar{v}_L = v - v_F, \tag{6}$$

where "$v_F$" again indicates the current position of the exposure window 200 on the recording medium 29 (FIG. 2a).

The read addresses $\bar{u}_L$ and $\bar{v}_L$ for the sub-memory 111 or 111' in read mode are forwarded via the address line 42 to the video memory means 17.

Via a line 135, the picture element clock sequence $T_1$ clocks the parallel-to-serial converter 132 such that it outputs the video signals for the individual picture elements to be recorded in synchronization with the recording. The picture element clock sequence $T_1$ is stepped down in the ratio 16:1 in a divider stage 136 and the stepped-down clock sequence forms the read instructions for the sub-memory 111 or 111' which are forwarded via a line 137 to the video memory means 116. The V-address counter 134 is pre-set via a programming input 138 to the plurality q of image lines storable in the sub-memories 88 and 88' or 111 and 111', respectively. After the pre-set plurality q of image lines, the V-address counter 134 respectively supplies a signal "Memory Change" which is forwarded via a line 139 to the mutiplexers 116 and 116', 123 and 130 in order to switch the sub-memories 111 and 111' from write mode to read mode or vice versa.

Figure 11:
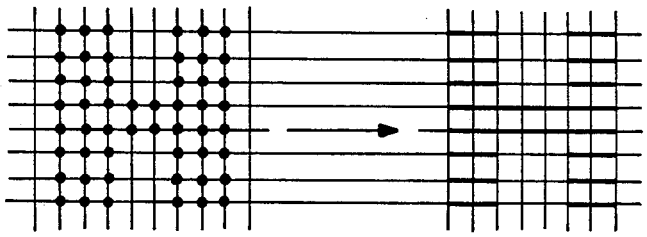
FIG. 11 is a graphic presentation with respect to exposure.

As an example, FIG. 11 shows the image-line-by-image-line recording of the letter "H" (at the right) on the recording medium 29 from the switch point image of this letter (at the left) which is stored in the video memory means 17.

FIG. 12 shows a time diagram for explaining the time sequences during write and read modes of the switch point memory means 62 in combination with the video memory means 17.

For a better understanding, FIG. 12 again schematically shows the two sub-memories 88 and 88' of the switch point memory means 62 functioning in alternate communication, and also shows the sub-memories 111 and 111' of the video memory means 17 of FIG. 9 which likewise function in alternate communication. The multiplexers are symbolized as mechanical switches.

In a first time interval from $t_0$ through $t_1$, the switch point marker signals of, for example, four characters for a first position of the exposure window 200 on the recording medium 29 are edited, in that first the switch point marker signals of the first character are written into the sub-memory 88. The lengths of the illustrated boxes corresponds to the time span required for the operation and the numerals entered in the boxes indicate which characters are being edited at the moment.

After the conclusion of the write operation for the first character, the switch point marker signals of the second character are already being written into the sub-memory 88'. During the write-in time, the switch point marker signals of the first character are already being read out from the sub-memory 88 and written into the sub-memory 111 of the video memory means 17. When the reading out of the switch point marker signals of the first character from the sub-memory 88 has been concluded, the switch point marker signals of the second character are likewise already being overwritten from the sub-memory 88' into the sub-memory 111 of the video memory means 17. This operation is repeated until the switch point marker signals of all four characters are stored in the sub-memory 111 of the video memory means 17.

The required number of changes of the sub-memories 88 and 88' in the switch point memory means 62 corresponds to the number of edited characters, whereby the memory changes are marked by crosses in the Figure.

In a second time interval from $t_1$ through $t_2$, the switch point marker signals of, for example, five characters for a second position of the exposure window 200 are edited and alternatingly overwritten from the sub-memories 88 and 88' into the sub-memory 111' of the video memory means 17, wheras the switch point marker signals for the first position of the exposure window 200 are read out from the sub-memory 111 of the video memory means 17 and recorded.

In a third time interval from $t_2$ through $t_3$, the switch point marker signals of, for example three characters for a third position of the exposure window 200 are edited and overwritten into the sub-memory 111 of the video memory means 17, whereas the memory content from the sub-memory 111' of the video memory means 17 is read out and recorded. A change of memory for the sub-memories 111 and 111' of the video memory means 17 respectively occurs at a new position of the exposure window 200.

The chronological control of the write and read operations is undertaken such that the time required for writing the switch point marker signals from the switch point memory means 62 into a sub-memory of the video memory means 17 is shorter than the readout time of the other sub-memory of the video memory means 17 dependent on the speed of the exposure.

FIG. 13 shows an illustrative example for the interpolation stage 60 for linear and circular interpolation. The interpolation stage 60 is essentially formed of an X-counter 145, a Y-counter 146, an $F_x$-adder/subtractor 147, an $F_y$-adder/subtractor 148, a comparator 149, two incrementation stages 150 and 151, an $F_x$-register 152, an $F_y$-register 153, a multiplexer 154, a memory register 155, as well as a control and logic stage 156.

The following references are cited with respect to the theory of the interpolations of lines and circular arcs:

1. "An Improved Algorithm For The Generation of Non Parametric Curves", IEEE Transactions on Computers, Vol. c-22, No. 12, December 1973, pages 1052 through 1060, incorporated herein by reference; and 2. "High-Speed Algorithm For The Generation of Straight Lines and Circular Arcs", IEEE Transactions on Computers, Vol. c-28, No. 10, October 1979, pages 728 through 736, incorporated herein by reference.

The functioning of the interpolation stage 60 shall be explained with reference to a linear interpolation (Ilin) along a straightline segment 74 according to FIG. 5. For this purpose, the instruction for linear interpolation (Ilin) is first forwarded to the control and logic stage 156 via the line 66. The coordinate difference values $\Delta x$ and $\Delta y$ of the corresponding straightline segment 74 between the starting point 75 and the end point 76 which are calculated in the arithmetic stage 59 (FIG. 4) in two's compelement and the corresponding operational signs ($x_s$ and $y_s$) are loaded via the line 69 into the X-counter 145 and the Y-counter 146. From these, the operational signs ($x_s$; $y_s$) proceed into the control and logic stage 156 which forwards corresponding instructions ($+/-F_x$; $+/-F_y$) to the adders/subtractors 147 and 148 by means of which these are switched to addition or subtraction. Depending on the operationsl sign ($x_s$; $y_s$) of the coordinate difference values $\Delta x$ and $\Delta y$, one of the four quadrants has been identified. At the same time, the $F_x$-register 152 and the $F_y$-register 153 are erased, so that the error value $F_n=0$ applies.

After this pre-adjustment, the interpolation errors $F_{xn+1}$ and $F_{yn+1}$ are calculated. The error calculation occurs dependent on the identified quadrant by addition or subtraction of $\Delta x$ and $\Delta y$ to/from the error value $F_n$ according to $F_{xn+1}=F_n\pm\Delta x$ and $F_{yn+1}=F_n\pm\Delta y$. The control is always undertaken such that one of the two calculations increases the error value $F_n$ and the other reduces it. In the first quadrant, for example, the one adder/subtractor is set to adder operation and the other adder/subtractor is set to subtractor operation. The error values $F_{xn+1}$ and $F_{yn+1}$ formed in the two adders/subtractors 147 and 148 are loaded via the incrementation stages 150 and 151—which are not needed given linear interpolation—into the $F_x$-register 152 and into the $F_y$-register 153, and are intermediately stored therein. The amounts of the error values and $|F_{xn+1}|$ and $|F_{yn+1}|$ are respectively compared to one another in the comparator 149. On the basis of the comparison result, the appropriate error value is supplied to the control and logic stage 156 via a line 157, and a decision is made in the control and logic stage 156 as to whether an interpolation step ($\pm x_i$, $\pm y_i$) in the X or Y direction is executed and with which operational sign. Accordingly, the corresponding interpolation step is always executed in the direction of the highest error value. On the basis of the comparison of the error values, moreover a determination is made in the control and logic stage 156 as to which of the two error values $F_{xn+1}$ or $F_{yn+1}$ should represent the error value $F_n$ for the next cycle. The determination is thus undertaken such that the smallest error value $F_{xn+1}$ or $F_{yn+1}$ is always selected as the new error value $F_n$. The selection of the smallest error value occurs with the assistance of the multiplexer 154 which is correspondingly switched by a selection instruction (Fhd sel) on a line 158 which is generated in the control and logic stage 156 and is intermediately stored in a memory register 155. The executed interpolation steps ($\pm x_i$, $\pm y_i$) are counted into the X-address counter 101 and the Y-address counter 102 (FIG. 4) via the lines 72 and 73 and, as already described in detail, are employed therein for address calculation for the switch point memory means 62. Since the address counters 101 and 102 are not component parts of the interpolation stage 60, they have only been indicated with broken lines in the Figure.

In order to generate the instruction "End of Segment" at the end point 76 of the straightline segment 74 (FIG. 5), the coordinate difference values $\Delta x$ and $\Delta y$ of the corresponding straightline segment are first loaded via programming inputs 159 and 160 into an X-length counter 161 and a Y-length counter 162. The executed interpolation steps ($\pm x_i$, $\pm y_i$) are counted into or out of the lengths counters 161 and 162 dependent on the operational sign. The current counter readings of the lengths counters 161 and 162 are monitored for the counter reading "zero" in a monitoring unit 163. When both counter readings are "zero", the end point 76 of the straightline segment 74 has been reached and the monitoring unit 163 outputs the instruction "End of Segment" on the line 70.

FIG. 14 shows an illustrative embodiment of the address controller 120 (FIG. 9). The address controller 120 serves the purpose of calling in the addresses $\bar{x}_L$ and $\bar{y}_L$ as well as $\bar{u}_S$ and $\bar{v}_S$ when overwriting the data from the memory means 62 into the memory means 17. The address controller 120 is formed of counters 300, 302, 304, 305 and 307 (of, for example, the type SN 74176 of Texas Instruments), of registers 301, 303 and 306 (of, for example, the type SN 74273), as well as of a clock generator 308. In a first time interval, the parameters listed in the specification are transferred into the registers 301, 303 and 306 as well as into the counters 300 and 305 via the line 68 with the assistance of loading clocks $T_{L1}$ through $T_{L5}$. The parameters are the width ZB of the character area 50, fed into the register 301, the length of the character area 50 ($Y_{max}-Y_{min}$) fed into the L-counter 300, the starting address $\bar{x}_{LO}$ fed into the register 303, the starting address $\bar{u}_{SO}$ fed into the register 306, and the starting address $\bar{v}_{SO}$ or $\bar{y}_{LO}$ fed into the counter 305. In a second time interval, the parameters are loaded into the counters 302, 304 and 307 with the assistance of further loading clocks $T_{L6}$, $T_{L7}$, and $T_{L8}$. In a third time interval, the call-in of the addresses $\bar{x}_L$ and $\bar{u}_S$ begins for the first memory line of the memory means 17 and 62 by counting counting clocks $T_{Z1}$ and $T_{Z2}$ into the counters 304 and 307 as well as the counting of a further counting clock $T_{Z3}$ into the counter 302. Since the width of a memory line of the memory means 62 corresponds to the width of the character area 50, the B-counter 302 emits a B-end signal on a line 309 to the clock generator 308 at the end of the character width or memory line, and the counting clocks $T_{Z1}$ and $T_{Z2}$ as well as the call-in of the addresses $\bar{x}_L$ and $\bar{u}_S$ for the first memory line are interrupted. Accordingly, the address area for $\bar{x}_L$ and $\bar{u}_S$ is limited to the character width. With the B-end signal, the clock generator 308 emits a counting clock $T_{Z4}$ for the counter 503, whereby the counter reading and thus the addresses $\bar{y}_L$ and $\bar{v}_S$ are incremented by 1. As a result thereof, the next memory line of the memory means 17 and 62 are now addressed, whereby the operations executed in the second and third time intervals are repeated. After a plurality of memory lines corresponding to the length of the character area 50 have been addressed, the L-counter 300 emits an L-end signal on a line 310 to the clock generator 308 and all counting clocks are disconnected. Thus, the address area for $\bar{y}_L$ and $\bar{v}_S$ is limited to the length of the character area. The described operations respectively repeat when the data of a new character are overwritten from the memory means 62 into the memory means 17.

Although various minor changes and modifications might be proposed by those skilled in the art, it will be understood that we wish to include within the claims of the patent warranted hereon all such changes and modifications as reasonably come within our contribution to the art.

We claim as our invention:

1. A method of recording characters from stored character data on a recording medium in electronic typesetting of a page, the character data required for recording being called up by text data representing set instructions and the character data being converted into a control signal for a recording element moving relative to said recording medium, and wherein said recording element records the characters picture-element-by-picture-element and image-line-by-image-line in a recording raster, said control signal defining a respective on-time of said recording element, comprising the steps of:
(a) before the recording
  (i) describing every closed contour of a character proceeding from a starting point on every contour by contour segments following one another in one circumferential direction around the contour, and defining coordinate values x, y of the contour segments in a coding raster of a first XY coordinate system referenced to an em-quad associated with the character, and storing the values as coded character data; and (b) during recording (i) calling up the coded character data of every character to be recorded by the text data and modifying the coordinate values $x_0$, $y_0$ of starting points on every contour, and the coordinate values x, y of the contour segments by a dimensional or scaling factor derived from a recording size of the characters and from a relationship of the recording raster to the coding raster;

(ii) determining picture element coordinates $x^*$, $y^*$ of those picture elements of the recording raster which optimally approximate a corresponding contour segment for every successive contour segment of the character by respective interpolation steps $x_i$, $y_i$ between intersections of the recording raster executed from a starting point to an end point of a contour segment;

(iii) checking successive interpolation steps $x_i$, $y_i$ for a change in direction;

(iv) respectively marking every identified picture element between two successive interpolation steps $x_i$, $y_i$ by a marker signal as a switch point for the recording element when a fixed directional change of the corresponding interpolation steps $x_i$, $y_i$ has taken place;

(v) providing a switch point memory oriented in picture element and image line fashion for the switch point marker signals of a character or character segment, a second $\overline{XY}$ coordinate system being allocated to this memory, and every memory line and every picture element therein being addressable by coordinate values $\bar{x}$, $\bar{y}$;

(vi) calculating write addresses $\bar{x}_S$, $\bar{y}_S$ for the switch point memory from the picture element coordinates $x^*$, $y^*$ of the picture elements of a character or character segment marked as switch points and from the position of the character or character segment to be recorded on the recording medium, and intermediately storing the switch point marker signals under the calculated write addresses $\bar{x}_S$, $\bar{y}_S$;

(vii) providing a video memory oriented in picture element and image line fashion for video data of the character for at least one image line of the recording raster, a third $\overline{UV}$ coordinate system being allocated to said video memory, and every memory line and every picture element therein being addressable by coordinate values $\bar{u}$, $\bar{v}$;

(viii) over-writing the switch point marker signals of a character or character segment stored in the switch point memory line-wise and character-by-character as video data onto those memory locations of the video memory which correspond to a position of the character or character segment to be recorded on the recording medium;

(ix) given line-by-line overwriting of the switch point marker signals onto the corresponding memory locations of the video memory, occupying the memory locations lying between the addressed memory locations in the line direction with video data at the same time;

(x) forming read addresses $\bar{u}_L$, $\bar{v}_L$ for the video memory from the coordinate values u, v of the picture elements currently to be recorded referenced to a fourth UV coordinate system allocated to the recording medium; and (xi) reading out the video data stored under the read addresses $\bar{u}_L$, $\bar{v}_L$ for recording the characters or character segments and employing the video data as the control signal for the recording element, so that the recording element is switched on or off for a respective duration of the control signal.

2. A method according to claim 1 including the steps of:

(a) recording the recording medium in strip-shaped sections which define exposure windows, a width of the exposure window in an image line direction corresponding to a width of the page to be typeset, and a height perpendicular to the image line direction comprising a plurality of image lines, and respectively shifting the exposure window for strip-shaped recording by its height on the recording medium;

(b) providing the switch point memory and video memory with a plurality of memory lines corresponding to the plurality of image lines; and (c) respectively allocating the memory lines of the switch point memory and the video memory to the image lines belonging to the current position of the exposure window on the recording medium.

3. A method according to claim 2 including the step of respectively writing only the switch points of those characters or character segments which fall at least partially into the corresponding exposure window into the switch point memory for every position of the exposure window on the recording medium.

4. A method according to claim 3 including the step of providing the text data with position data for the characters on the recording medium in the form of position coordinates, and identifying the characters or character segments falling at least partially within the respective exposure window by a comparison of the position coordinates of the text data to current position coordinates of the exposure window in the UV coordinate system.

5. A method according to claim 1 wherein a picture element is marked as a switch point on a contour when at least one of the successive interpolation steps $x_i$, $y_i$ occurs perpendicular to the image line direction and both successive interpolation steps $x_i$, $y_i$ occur in a circumferential direction of the contour.

6. A method according to claim 1 wherein when overwriting the switch point marker signals from the switch point memory into the video memory, those memory locations of the video memory are simultaneously occupied with video data, specifically those memory locations respectively lying in the image line direction between memory locations that are marked as switch points on leading edges of black image segments of the characters or character segments intersected by the image lines and memory locations that are marked as switch points on trailing edges of the corresponding black image segments.

7. A method according to claim 1 including the steps of:

(a) identifying coordinate difference values $\Delta x$, $\Delta y$ between the starting point and the end point of a contour segment;

(b) adding up the interpolation steps $x_i$, $y_i$ according to operational signs; and (c) generating a signal "End of Segment" for a contour segment when the sums of the executed interpolation steps $x_i$, $y_i$ are equal to the coordinate difference values $\Delta x$, $\Delta y$.

8. A method according to claim 1 including the steps of:
   (a) forming the switch point memory of two sub-memories and operating them in alternating communication;
   (b) overwriting the switch point marker signals of a character or of a character segment as video data from one of the sub-memories into the video memory; and
   (c) simultaneously writing the switch point marker signals of the following character or character segment into the other sub-memory.

9. A method according to claim 2 including the steps of:
   (a) forming the video memory of two sub-memories and operating them in alternating communication;
   (b) reading out the video data of the characters or character segments to be recorded for a position of the exposure window from one of the sub-memories; and
   (c) simultaneously overwriting the switch point marker signals of the characters or character segments for the following position of the exposure window as video data from the switch point memory into the other sub-memory of the video memory.

10. A method according to claim 2 including the steps of calculating write addresses $\bar{x}_{Sn}$, $\bar{y}_{Sn}$ in the $\overline{XY}$ coordinate system required for writing the switch point marker signals of a character or character segment into the switch point memory from modified coordinate values $x'_0$, $y'_0$ of the starting points, from a sum of n interpolation steps $x_i$, $y_i$ executed at the corresponding switch points, and from a position of the character and of the exposure window perpendicular to the image line direction according to the equations:

$$\bar{x}_{Sn} = x'_0 + \sum_1^n x_i$$

$$\bar{y}_{Sn} = v_g - v_F - y'_0 - \sum_1^n y_i$$

where "$v_g$" denotes a coordinate value of a font base line of a corresponding font and "$v_F$" denotes a coordinate value of an upper edge of the exposure window perpendicular to the image line direction in the UV coordinate system, and whereby "$x'_0$" and "$v_g - v_F - y'_0$" represent a respective starting address.

11. A method according to claim 1 including the step of calling up the read addresses $\bar{x}_L$, $\bar{y}_L$ in the $\overline{XY}$ coordinate system for the switch point memory picture-element-by-picture-element and image-line-by-image-line for overwriting the switch point marker signals into the video memory.

12. A method according to claim 11 including the step of respectively limiting the characters by a character area in the character em-quad, and limiting a called-up area of the read addresses $\bar{x}_L$, $\bar{y}_L$ for a character to a respective character area of the character.

13. A method according to claim 1 including the step of calculating write addresses $\bar{u}_S$, $\bar{v}_S$ in the $\overline{UV}$ coordinate system required for writing the switch point marker signals of a character or character segment into the video memory from read addresses $\bar{x}_L$, $\bar{y}_L$ of the switch point memory and from position coordinates of the corresponding character or character segment on the recording medium in an image line direction according to the equations:

$$\bar{u}_S = \bar{u}_0 + \Sigma GB + VB + \bar{x}_L$$

$$\bar{v}_S = \bar{y}_L$$

where "$\bar{u}_0$" denotes a beginning of a text line on the recording medium, "GB" denotes an overall width of the character em-quad, "$\Sigma GB$" denotes a sum of overall widths "GB" of the preceding characters or character segments in an image line, and "VB" denotes a front porch width of a current character referred to the UV coordinate system allocated to the recording medium.

14. A method according to claim 2 including the step of calculating read addresses $\bar{u}_L$, $\bar{v}_L$ in the UV coordinate system required for picture-element-by-picture-element readout of the video data from the video memory from picture element coordinates u, v of current picture elements on the recording medium and from a respective position coordinate value $v_F$ of the exposure window in the UV coordinate system according to the equations:

$$\bar{u}_L = u$$

$$\bar{v}_L = v - v_F.$$

15. A method according to claim 1 including the steps of providing the contour segments as straightline segments, clockwise circular segments, and counter-clockwise circular segments.

16. A method according to claim 1 including the step of fixing a circumferential direction of travel at an outside contour of a character in a clockwise direction, and fixing a circumferential direction of travel in a counter-clockwise direction at an inside contour of the character.

17. A method according to claim 1 including the step of providing the coded character data with characteristic data as area parameters for the characters and the character em-quads, contour instructions, and starting point coordinates $x_0$, $y_0$ for every contour.

18. A method according to claim 17 including the step of combining respectively successive contour segments of a same type into a contour instruction which contains information concerning a type of the contour segments, a number of contour segments of the same type, and coordinate values for every contour segment.

19. A method according to claim 18 including providing for a straightline segment respective coordinate values of the end point, and for a circular segment respective coordinate values of the end point and coordinate values of the starting point relative to a center point of the circle of the corresponding circular segment.

20. A method according to claim 1 including the step of providing a minimum width of a memory line of the switch point memory so that it corresponds to a width of a largest unrotated character and a maximum width of the memory line so that it corresponds to a width of a largest character in a rotated position.

21. A method according to claim 1 including the step of providing a width of a memory line of the video memory so that it corresponds to a width of an image line on a page to be recorded.

22. A method according to claim 2 including the step of recording every segment of a character which falls into the exposure window in a current position of the exposure window.

23. A method according to claim 1 including the step of simultaneously erasing the sub-memories of the switch point memory and the sub-memories of the video memory when reading stored data.

24. An apparatus for recording characters from stored character data on a recording medium for electronic typesetting of a page, comprising:
 (a) memory means for text data;
 (b) character memory means connected to the memory means for storage of coded character data in the form of contour segments and for calling up coded character data based on text data;
 (c) video signal generator means connected to communicate with the character memory means for conversion of called-up, coded character data into video data;
 (d) a recording element controlled by a control signal;
 (e) video memory means connected to the video signal generator means and to the recording element for intermediate storage of video data used in generating said control signal;
 (f) synchronization address controller means connected to the intermediate memory means for generating read addresses $\bar{u}_L$, $\bar{v}_L$ for the video memory means dependent on a relative position of the recording element to the recording medium;
 (g) a shiftable recording carrier means for the recording medium;
 (h) said video signal generator means comprising:
  (i) editing means connected to the character memory means for editing the coded character data, for acquiring coordinate values $x_0$, $y_0$ of starting points, coordinate values $x$, $y$ of the contour segments, coordinate difference values between starting points and end points of the contour segments, and instructions from the coded character data;
  (ii) interpolation stage means connected to the editing means for determining picture element coordinates $x^*$, $y^*$ of those picture elements in a recording raster which optimally approximate the contour segments of the characters or character segments by corresponding interpolation steps $x_i$, $y_i$;
  (iii) an evaluation stage means in communication with the interpolation stage means for checking successive interpolation steps $x_i$, $y_i$ i for a directional change and for marking picture elements as switch points of a character or character segment given a defined interpolation step combination by means of switch point marker signals;
  (iv) switch point memory means connected to the evaluation stage means for storing the switch point marker signals of the identified switch points of a character or character segment;
  (v) address counter means connected to the editing means, to the interpolation stage means, and to the switch point memory means for generating write addresses $\bar{x}_S$, $\bar{y}_S$ for the switch point memory means;
 (i) said video memory means being connected to the switch point memory means for overwriting the switch point marker signals of the individual characters from the switch point memory means onto memory locations of the video memory means which correspond to portions of the characters on the recording medium; and
 (j) address controller means connected to the editing means, to the switch point memory means, and to the video memory means for generating read addresses $\bar{x}_L$, $\bar{y}_L$ for the switch point memory means and write addresses $\bar{u}_S$, $\bar{v}_S$ for the video memory means when overwriting the switch point marker signals.

25. An apparatus according to claim 24 wherein said editing means comprises:
 (a) decoder means for decoding the character data;
 (b) transformation stage means connected to the decoder means for modifying the coordinate values by a dimensional or scaling factor; and
 (c) arithmetic stage means connected to the transformation stage means.

26. An apparatus according to claim 24 wherein the recording element comprises:
 (a) a laser beam generator;
 (b) modulator means controlled by the control signal for switching the laser beam on and off; and
 (c) deflection means for deflecting the laser beam across the recording medium.

27. An apparatus according to claim 26 wherein the deflection means is a polygonal mirror.

28. An apparatus according to claim 24 wherein the memory means for the text data comprises a comparison means for comparing position coordinates of the characters contained in the text data to position coordinates of a strip-shaped recording forming an exposure window.

29. An apparatus according to claim 24 wherein the switch point memory means is formed of two sub-memories and means for operating the sub-memories in alternating communication is connected thereto.

30. An apparatus according to claim 24 wherein the video memory means is formed of two sub-memories, and means for operating the sub-memories in alternating communication is connected thereto.

* * * * *